US008474628B1

(12) United States Patent
Appelman et al.

(10) Patent No.: US 8,474,628 B1
(45) Date of Patent: Jul. 2, 2013

(54) PRESENTING A RECIPIENT OF AN E-MAIL WITH AN OPTION TO INSTANT MESSAGE A SENDER OR ANOTHER RECIPIENT BASED ON THE SENDER'S OR THE OTHER RECIPIENT'S ADDRESS AND ONLINE STATUS

(75) Inventors: Barry Appelman, McLean, VA (US); Larry L. Lu, Great Falls, VA (US); Alisa Clemmons, Oakland, CA (US); Peter Weck, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 1603 days.

(21) Appl. No.: 11/150,180

(22) Filed: Jun. 13, 2005

Related U.S. Application Data

(63) Continuation of application No. 09/848,232, filed on May 4, 2001, now Pat. No. 6,912,564.

(60) Provisional application No. 60/201,738, filed on May 4, 2000, provisional application No. 60/229,311, filed on Sep. 1, 2000.

(51) Int. Cl.
*G06F 13/00* (2006.01)

(52) U.S. Cl.
USPC ............................................. 209/206

(58) Field of Classification Search
USPC ............................................. 709/206
See application file for complete search history.

(56) References Cited

U.S. PATENT DOCUMENTS

| | | | |
|---|---|---|---|
| 4,837,798 A | 6/1989 | Cohen et al. | |
| 5,086,394 A | 2/1992 | Shapira | |
| 5,276,905 A | 1/1994 | Hurst et al. | |
| 5,327,486 A | 7/1994 | Wolff et al. | |
| 5,533,110 A | 7/1996 | Pinard et al. | |
| 5,548,637 A | 8/1996 | Heller et al. | |
| 5,557,659 A | 9/1996 | Hyde-Thomson | |
| 5,583,920 A | 12/1996 | Wheeler, Jr. | |
| 5,608,786 A | 3/1997 | Gordon | |

(Continued)

FOREIGN PATENT DOCUMENTS

| | | |
|---|---|---|
| EP | 862304 A2 | 9/1998 |
| EP | 1176840 A1 | 1/2002 |

(Continued)

OTHER PUBLICATIONS

Office Action, U.S. Appl. No. 09/843,788, dated Apr. 19, 2007, 17 pages.

(Continued)

*Primary Examiner* — Robert B Harrell
(74) *Attorney, Agent, or Firm* — Keller Jolley Preece

(57) ABSTRACT

Systems and techniques for transferring electronic data between users of a communications system include a host system structured and arranged to receive and deliver messages of various types between users of the communications system. The host system includes an instant messaging network; a mail gateway; and a configuring network in communication with both the instant messaging network and the mail gateway. The instant messaging network enables instant messaging communication between users of the communications system and has the capability to monitor whether a certain user is capable of receiving an instant message at a particular moment. The mail gateway receives and delivers e-mail messages to users of the communications system. The configuring network is dedicated to automatically configuring instant messaging communication between an intended recipient of an e-mail message and the sender of the e-mail message.

18 Claims, 9 Drawing Sheets

U.S. PATENT DOCUMENTS

| | | | |
|---|---|---|---|
| 5,610,910 A | 3/1997 | Focsaneanu et al. | |
| 5,650,994 A | 7/1997 | Daley | |
| 5,694,616 A | 12/1997 | Johnson et al. | |
| 5,721,906 A | 2/1998 | Siefert | |
| 5,742,905 A | 4/1998 | Pepe et al. | |
| 5,764,916 A | 6/1998 | Busey et al. | |
| 5,774,670 A | 6/1998 | Montulli | |
| 5,790,800 A | 8/1998 | Gauvin et al. | |
| 5,793,365 A | 8/1998 | Tang et al. | |
| 5,802,470 A | 9/1998 | Gaulke et al. | |
| 5,835,724 A | 11/1998 | Smith | |
| 5,848,134 A | 12/1998 | Sekiguchi et al. | |
| 5,850,594 A | 12/1998 | Cannon et al. | |
| 5,859,979 A | 1/1999 | Tung et al. | |
| 5,867,162 A | 2/1999 | O'Leary et al. | |
| 5,870,744 A | 2/1999 | Sprague | |
| 5,872,521 A | 2/1999 | Lopatukin et al. | |
| 5,878,219 A | 3/1999 | Vance, Jr. et al. | |
| 5,893,091 A | 4/1999 | Hunt et al. | |
| 5,893,099 A | 4/1999 | Schreiber et al. | |
| 5,919,247 A | 7/1999 | Van Hoff et al. | |
| 5,920,692 A | 7/1999 | Nguyen et al. | |
| 5,940,488 A | 8/1999 | DeGrazia et al. | |
| 5,946,617 A | 8/1999 | Portaro et al. | |
| 5,948,058 A | 9/1999 | Kudoh et al. | |
| 5,951,643 A | 9/1999 | Shelton et al. | |
| 5,951,646 A | 9/1999 | Brandon | |
| 5,951,652 A | 9/1999 | Ingrassia, Jr. et al. | |
| 5,954,798 A | 9/1999 | Shelton et al. | |
| 5,956,716 A | 9/1999 | Kenner et al. | |
| 5,960,173 A | 9/1999 | Tang et al. | |
| 5,983,369 A | 11/1999 | Bakoglu et al. | |
| 5,987,113 A | 11/1999 | James | |
| 5,987,407 A | 11/1999 | Wu et al. | |
| 5,991,791 A | 11/1999 | Siefert | |
| 5,995,023 A | 11/1999 | Kreft | |
| 6,002,402 A * | 12/1999 | Schacher | 715/810 |
| 6,006,179 A | 12/1999 | Wu et al. | |
| 6,009,413 A | 12/1999 | Webber et al. | |
| 6,012,051 A | 1/2000 | Sammon, Jr. et al. | |
| 6,014,135 A | 1/2000 | Fernandes | |
| 6,014,638 A | 1/2000 | Burge et al. | |
| 6,026,403 A | 2/2000 | Siefert | |
| 6,026,429 A | 2/2000 | Jones et al. | |
| 6,049,533 A | 4/2000 | Norman et al. | |
| 6,065,047 A | 5/2000 | Carpenter et al. | |
| 6,070,171 A | 5/2000 | Snyder et al. | |
| 6,073,138 A | 6/2000 | De l'Etraz et al. | |
| 6,081,830 A | 6/2000 | Schindler | |
| 6,085,223 A | 7/2000 | Carino, Jr. et al. | |
| 6,088,435 A | 7/2000 | Barber et al. | |
| 6,134,432 A | 10/2000 | Holmes et al. | |
| 6,134,642 A | 10/2000 | Holmes et al. | |
| 6,144,991 A | 11/2000 | England | |
| 6,151,584 A | 11/2000 | Papierniak et al. | |
| 6,161,130 A | 12/2000 | Horvitz et al. | |
| 6,166,730 A | 12/2000 | Goode et al. | |
| 6,175,831 B1 | 1/2001 | Weinreich et al. | |
| 6,192,395 B1 | 2/2001 | Lerner et al. | |
| 6,195,354 B1 | 2/2001 | Skalecki et al. | |
| 6,199,103 B1 | 3/2001 | Sakaguchi et al. | |
| 6,212,548 B1 | 4/2001 | DeSimone et al. | |
| 6,212,550 B1 | 4/2001 | Segur | |
| 6,223,213 B1 | 4/2001 | Cleron et al. | |
| 6,233,577 B1 | 5/2001 | Ramasubramani et al. | |
| 6,249,740 B1 | 6/2001 | Ito et al. | |
| 6,249,743 B1 | 6/2001 | Ohshimo | |
| 6,260,148 B1 | 7/2001 | Aggarwal et al. | |
| 6,269,369 B1 | 7/2001 | Robertson | |
| 6,301,609 B1 | 10/2001 | Aravamudan et al. | |
| 6,306,004 B1 | 10/2001 | Farrar | |
| 6,311,211 B1 | 10/2001 | Shaw et al. | |
| 6,314,450 B1 | 11/2001 | Hachiya et al. | |
| 6,317,776 B1 | 11/2001 | Broussard et al. | |
| 6,324,541 B1 | 11/2001 | De l'Etraz et al. | |
| 6,330,590 B1 | 12/2001 | Cotton | |
| 6,347,332 B1 | 2/2002 | Malet et al. | |
| 6,351,698 B1 | 2/2002 | Kubota et al. | |
| 6,363,392 B1 | 3/2002 | Halstead et al. | |
| 6,374,246 B1 | 4/2002 | Matsuo | |
| 6,374,290 B1 | 4/2002 | Scharber et al. | |
| 6,389,127 B1 | 5/2002 | Vardi et al. | |
| 6,389,372 B1 | 5/2002 | Glance et al. | |
| 6,393,464 B1 | 5/2002 | Dieterman | |
| 6,400,381 B1 | 6/2002 | Barrett et al. | |
| 6,405,035 B1 | 6/2002 | Singh | |
| 6,405,249 B1 | 6/2002 | Matsuda et al. | |
| 6,415,318 B1 | 7/2002 | Aggarwal et al. | |
| 6,421,439 B1 | 7/2002 | Liffick | |
| 6,421,709 B1 | 7/2002 | McCormick et al. | |
| 6,425,012 B1 | 7/2002 | Trovato et al. | |
| 6,430,344 B1 | 8/2002 | Dixon et al. | |
| 6,430,604 B1 | 8/2002 | Ogle et al. | |
| 6,446,112 B1 | 9/2002 | Bunney et al. | |
| 6,449,344 B1 | 9/2002 | Goldfinger et al. | |
| 6,449,634 B1 | 9/2002 | Capiel | |
| 6,480,885 B1 | 11/2002 | Olivier | |
| 6,484,196 B1 | 11/2002 | Maurille | |
| 6,501,834 B1 | 12/2002 | Milewski et al. | |
| 6,507,866 B1 | 1/2003 | Barchi | |
| 6,525,747 B1 | 2/2003 | Bezos | |
| 6,529,475 B1 | 3/2003 | Wan et al. | |
| 6,535,586 B1 | 3/2003 | Cloutier et al. | |
| 6,539,421 B1 | 3/2003 | Appelman et al. | |
| 6,549,937 B1 | 4/2003 | Auerbach et al. | |
| 6,557,027 B1 | 4/2003 | Cragun | |
| 6,559,863 B1 | 5/2003 | Megiddo | |
| 6,564,248 B1 | 5/2003 | Budge et al. | |
| 6,564,261 B1 | 5/2003 | Gudjonsson et al. | |
| 6,571,234 B1 | 5/2003 | Knight et al. | |
| 6,574,599 B1 | 6/2003 | Lim et al. | |
| 6,580,790 B1 | 6/2003 | Henry et al. | |
| 6,606,647 B2 | 8/2003 | Shah et al. | |
| 6,615,241 B1 | 9/2003 | Miller et al. | |
| 6,636,733 B1 | 10/2003 | Helferich | |
| 6,640,230 B1 | 10/2003 | Alexander et al. | |
| 6,654,683 B2 | 11/2003 | Jin et al. | |
| 6,677,968 B1 | 1/2004 | Appelman | |
| 6,677,976 B2 | 1/2004 | Parker et al. | |
| 6,678,719 B1 | 1/2004 | Stimmel | |
| 6,691,162 B1 | 2/2004 | Wick | |
| 6,697,807 B2 | 2/2004 | McGeachie | |
| 6,701,348 B2 | 3/2004 | Sommerer | |
| 6,714,791 B2 | 3/2004 | Friedman | |
| 6,714,793 B1 * | 3/2004 | Carey et al. | 455/466 |
| 6,731,308 B1 | 5/2004 | Tang et al. | |
| 6,732,155 B2 | 5/2004 | Meek | |
| 6,738,822 B2 | 5/2004 | Fukasawa et al. | |
| 6,747,970 B1 | 6/2004 | Lamb et al. | |
| 6,748,421 B1 | 6/2004 | Ozkan et al. | |
| 6,750,881 B1 | 6/2004 | Appelman | |
| 6,757,365 B1 | 6/2004 | Bogard | |
| 6,757,732 B1 | 6/2004 | Sollee et al. | |
| 6,772,188 B1 | 8/2004 | Cloutier | |
| 6,781,608 B1 | 8/2004 | Crawford | |
| 6,785,554 B1 | 8/2004 | Amerga | |
| 6,785,681 B2 | 8/2004 | Keskar et al. | |
| 6,785,781 B2 | 8/2004 | Leenstra et al. | |
| 6,788,769 B1 | 9/2004 | Waites | |
| 6,795,863 B1 | 9/2004 | Doty, Jr. | |
| 6,799,039 B2 | 9/2004 | Wu et al. | |
| 6,800,031 B2 | 10/2004 | Di Cesare | |
| 6,807,574 B1 | 10/2004 | Partovi et al. | |
| 6,839,737 B1 | 1/2005 | Friskel | |
| 6,857,006 B1 | 2/2005 | Nishizawa | |
| 6,879,665 B1 | 4/2005 | Cook et al. | |
| 6,901,559 B1 | 5/2005 | Blum et al. | |
| 6,904,026 B1 | 6/2005 | Tarnanen et al. | |
| 6,907,243 B1 | 6/2005 | Patel | |
| 6,912,563 B1 | 6/2005 | Parker et al. | |
| 6,912,564 B1 | 6/2005 | Appelman et al. | |
| 6,917,965 B2 | 7/2005 | Gupta et al. | |
| 6,920,478 B2 | 7/2005 | Mendiola et al. | |
| 6,941,345 B1 | 9/2005 | Kapil et al. | |
| 6,968,179 B1 | 11/2005 | De Vries | |
| 6,993,564 B2 | 1/2006 | Whitten, II | |
| 6,996,520 B2 | 2/2006 | Levin | |

| | | | | | | |
|---|---|---|---|---|---|---|
| 7,035,865 | B2 | 4/2006 | Doss et al. | 2003/0212804 A1 | 11/2003 | Hashemi |
| 7,039,676 | B1 | 5/2006 | Day et al. | 2003/0225847 A1 | 12/2003 | Heikes et al. |
| 7,043,530 | B2 | 5/2006 | Isaacs et al. | 2003/0236835 A1 | 12/2003 | Levi et al. |
| 7,058,036 | B1* | 6/2006 | Yu et al. .............. 370/335 | 2004/0015548 A1 | 1/2004 | Lee |
| 7,058,690 | B2 | 6/2006 | Maehiro | 2004/0054729 A1 | 3/2004 | Fukuizumi et al. |
| 7,065,186 | B1 | 6/2006 | Myers et al. | 2004/0056901 A1 | 3/2004 | March et al. |
| 7,076,546 | B1 | 7/2006 | Bates et al. | 2004/0117443 A1 | 6/2004 | Barsness |
| 7,082,047 | B2 | 7/2006 | Chow | 2004/0122681 A1 | 6/2004 | Ruvolo |
| 7,082,407 | B1* | 7/2006 | Bezos et al. .............. 705/26 | 2004/0122810 A1 | 6/2004 | Mayer |
| 7,120,687 | B1 | 10/2006 | Tessman, Jr. et al. | 2004/0122855 A1 | 6/2004 | Ruvolo |
| 7,124,123 | B1 | 10/2006 | Roskind et al. | 2004/0128356 A1 | 7/2004 | Bernstein et al. |
| 7,127,232 | B2 | 10/2006 | O'Neil et al. | 2004/0179039 A1 | 9/2004 | Blattner et al. |
| 7,149,208 | B2 | 12/2006 | Mattaway et al. | 2004/0186738 A1 | 9/2004 | Reisman |
| 7,171,473 | B1 | 1/2007 | Eftis et al. | 2004/0210844 A1 | 10/2004 | Pettinati et al. |
| 7,177,880 | B2 | 2/2007 | Ruvolo | 2004/0215648 A1 | 10/2004 | Marshall |
| 7,185,059 | B2 | 2/2007 | Daniell et al. | 2004/0215721 A1 | 10/2004 | Szeto et al. |
| 7,190,956 | B2 | 3/2007 | Dorenbosch et al. | 2004/0260762 A1 | 12/2004 | Fish |
| 7,200,634 | B2 | 4/2007 | Mendiola et al. | 2005/0015432 A1 | 1/2005 | Cohen |
| 7,202,814 | B2 | 4/2007 | Caspi et al. | 2005/0021750 A1 | 1/2005 | Abrams |
| 7,222,156 | B2 | 5/2007 | Gupta et al. | 2005/0027382 A1 | 2/2005 | Kirmse et al. |
| 7,233,992 | B1 | 6/2007 | Muldoon et al. | 2005/0038856 A1 | 2/2005 | Krishnasamy et al. |
| 7,275,215 | B2 | 9/2007 | Wemdorfer et al. | 2005/0043989 A1 | 2/2005 | Shifrin |
| 7,313,760 | B2 | 12/2007 | Grossman et al. | 2005/0044152 A1 | 2/2005 | Hardy et al. |
| 7,436,780 | B2 | 10/2008 | Stephens et al. | 2005/0050143 A1 | 3/2005 | Gusler et al. |
| 7,437,413 | B2 | 10/2008 | Okuyama et al. | 2005/0060377 A1 | 3/2005 | Lo et al. |
| 7,512,652 | B1 | 3/2009 | Appelman et al. | 2005/0076241 A1 | 4/2005 | Appelman |
| 7,765,484 | B2 | 7/2010 | Roskind | 2005/0080863 A1 | 4/2005 | Danielf |
| 7,979,802 | B1 | 7/2011 | Appelman | 2005/0086211 A1 | 4/2005 | Mayer |
| 8,122,363 | B1 | 2/2012 | Appelman | 2005/0102202 A1 | 5/2005 | Linden et al. |
| 8,132,110 | B1 | 3/2012 | Appelman et al. | 2005/0114275 A1 | 5/2005 | Ackley et al. |
| 2001/0005861 | A1 | 6/2001 | Mousseau et al. | 2005/0153681 A1 | 7/2005 | Hanson |
| 2001/0013050 | A1 | 8/2001 | Shah | 2005/0197846 A1 | 9/2005 | Pezaris |
| 2002/0015061 | A1 | 2/2002 | Maguire | 2005/0198173 A1 | 9/2005 | Evans |
| 2002/0021307 | A1 | 2/2002 | Glenn et al. | 2006/0075044 A1 | 4/2006 | Fox et al. |
| 2002/0023132 | A1 | 2/2002 | Tornabene et al. | 2006/0167991 A1 | 7/2006 | Heikes et al. |
| 2002/0023134 | A1 | 2/2002 | Roskowski et al. | 2006/0168054 A1 | 7/2006 | Burkhart et al. |
| 2002/0028595 | A1 | 3/2002 | Higashi et al. | 2006/0173824 A1 | 8/2006 | Bensky et al. |
| 2002/0042816 | A1 | 4/2002 | Bae | 2006/0173963 A1 | 8/2006 | Roseway et al. |
| 2002/0049717 | A1 | 4/2002 | Routtenberg et al. | 2006/0182248 A1 | 8/2006 | Smith et al. |
| 2002/0056123 | A1 | 5/2002 | Liwerant et al. | 2006/0212561 A1 | 9/2006 | Feng |
| 2002/0065856 | A1 | 5/2002 | Kisiel | 2006/0277187 A1 | 12/2006 | Roese et al. |
| 2002/0065894 | A1 | 5/2002 | Dalal et al. | 2007/0156664 A1 | 7/2007 | Norton et al. |
| 2002/0077080 | A1 | 6/2002 | Greene | 2008/0082620 A1 | 4/2008 | Barsness |
| 2002/0083136 | A1 | 6/2002 | Whitten, II | 2009/0089316 A1 | 4/2009 | Kogan et al. |
| 2002/0091667 | A1 | 7/2002 | Jaipuria et al. | 2010/0184517 A1 | 7/2010 | Danieli et al. |
| 2002/0103801 | A1 | 8/2002 | Lyons | 2011/0231507 A1 | 9/2011 | Appelman |
| 2002/0112181 | A1 | 8/2002 | Smith | 2012/0144310 A1 | 6/2012 | Appelman |
| 2002/0116463 | A1 | 8/2002 | Hart | | | |
| 2002/0116641 | A1 | 8/2002 | Mastrianni | | FOREIGN PATENT DOCUMENTS | |
| 2002/0133292 | A1 | 9/2002 | Miyaki | GB | 2319137 | 5/1998 |
| 2002/0133369 | A1 | 9/2002 | Johnson | GB | 2357932 A | 7/2001 |
| 2002/0147777 | A1 | 10/2002 | Hackbarth et al. | GB | 2368747 | 5/2002 |
| 2002/0174010 | A1 | 11/2002 | Rice, III | JP | 2008-314826 | 11/1996 |
| 2002/0175953 | A1 | 11/2002 | Lin | JP | 2000-049901 | 2/2000 |
| 2003/0275953 | | 11/2002 | Lin | JP | 2000-499001 | 2/2000 |
| 2002/0181703 | A1 | 12/2002 | Logan et al. | JP | 2000-259514 | 9/2000 |
| 2002/0184089 | A1 | 12/2002 | Tsou et al. | JP | 2000-284999 | 10/2000 |
| 2002/0193942 | A1 | 12/2002 | Odakura et al. | JP | 2001-084320 | 3/2001 |
| 2002/0199095 | A1 | 12/2002 | Bandini et al. | WO | WO 97/10558 | 3/1997 |
| 2003/0004855 | A1 | 1/2003 | Dutta et al. | WO | 97/14234 | 4/1997 |
| 2003/0004872 | A1 | 1/2003 | Gardi et al. | WO | WO 97/46955 | 12/1997 |
| 2003/0009385 | A1 | 1/2003 | Tucciarone et al. | WO | WO 98/16045 | 4/1998 |
| 2003/0009523 | A1 | 1/2003 | Lindskog et al. | WO | WO 98/47270 | 10/1998 |
| 2003/0018726 | A1 | 1/2003 | Low et al. | WO | WO 99/08434 | 2/1999 |
| 2003/0023875 | A1 | 1/2003 | Hursey et al. | WO | WO 99/34628 | 7/1999 |
| 2003/0028524 | A1 | 2/2003 | Keskar et al. | WO | WO 99/48011 | 9/1999 |
| 2003/0028595 | A1 | 2/2003 | Vogt et al. | WO | WO 00/16201 | 3/2000 |
| 2003/0037112 | A1 | 2/2003 | Fitzpatrick et al. | WO | WO 00/24154 | 4/2000 |
| 2003/0043201 | A1 | 3/2003 | Abdelhadi et al. | WO | WO 00/60809 | 10/2000 |
| 2003/0046198 | A1 | 3/2003 | Knapp et al. | WO | WO 00/79396 | 12/2000 |
| 2003/0050916 | A1 | 3/2003 | Ortega et al. | WO | WO 01/06748 | 1/2001 |
| 2003/0084103 | A1 | 5/2003 | Weiner et al. | WO | WO 01/22258 | 3/2001 |
| 2003/0093580 | A1 | 5/2003 | Thomas et al. | WO | WO 01/24036 | 4/2001 |
| 2003/0105822 | A1 | 6/2003 | Gusler et al. | WO | WO 01/43357 | 5/2001 |
| 2003/0131061 | A1 | 7/2003 | Newton et al. | WO | WO 01/67787 | 9/2001 |
| 2003/0140103 | A1 | 7/2003 | Szeto et al. | WO | WO 01/72020 | 9/2001 |
| 2003/0167324 | A1 | 9/2003 | Farnham et al. | WO | WO 01/80079 | 10/2001 |
| 2003/0182394 | A1 | 9/2003 | Ryngler et al. | WO | 02/03216 | 1/2002 |
| 2003/0187813 | A1 | 10/2003 | Goldman et al. | WO | WO 02/03216 | 1/2002 |

| WO | WO 02/09437 | 1/2002 |
| WO | WO 02/35781 | 5/2002 |
| WO | WO 02/062039 | 8/2002 |
| WO | WO 02/073886 | 9/2002 |
| WO | WO 2004/028178 | 4/2004 |
| WO | WO 2005/086723 | 9/2005 |

OTHER PUBLICATIONS

Office Action, U.S. Appl. No. 10/146,814, dated Dec. 11, 2006, 15 pages.
Office Action for U.S. Appl. No. 10/633,636 mailed Oct. 11, 2006.
Ed Bott and Ron Person, Using Windows 95 with Internet Explorer 4.0, Feb. 17, 1998, Que, Special Edition.
America Online Inc., New AIM 4.7, Sep. 27, 2001, Internet: http://aim.aol.com.
America Online Inc., "AOL Instant Messenger", Aug. 29, 2000, Internet: www.aol.com/aim/.
CNET Networks Inc., "PopUp Killer", Sep. 13, 2001, Internet: download.cnet.com/downloads/0-10059-100-6932612.html.
WebmasterWorld.com Inc., "HTML and Browsers", Mar. 5, 2001, Internet www.webmaster.com/forum21/367.htm.
"AOL technology: turning complicated things into engaging services", 1996 Annual Report, 22 pages.
"YAHOO! Messenger Makes the World a Little Smaller, More Informed", pp. 1-2, Jun. 21, 1999.
Alan Cohen, "Instant Messaging", Apr. 13, 1999, PC Magazine, PC Labs, 2 pages.
"AOL Instant Messenger Windows Beta Features", Jun. 24, 1999, 2 pages, AOL Instant Messenger All New Version 2.0, 2 pages, Jun. 24, 1999, What is AOL Instant Messanger, 3 pages, Jun. 24, 1999, Quick Tips for Getting Started, 5 pages, Jun. 24, 1999, Frequently Asked Questions About AOL Instant Messenger, 6 pages, Jun. 24, 1999.
Eschenburg, Wo laufen sic denn?, Oct. 26, 1998, pp. 92-95.
Kohda et al., IMPP: A New Instant Messaging Standard and Its Impact on Internet Business, Dec. 2000, Fujitsu Sci. Tech. J., 36, 2, pgs. 147-153.
International Search Report for International Application No. PCT/US03/15715, mailed Aug. 14, 2003.
"What new about exchanging information over the Internet," Outlook 2000 SR-1 (9.0.0.4527) Help File, on or before Aug. 10, 2001, p. 1.
"About Internet directory services," Outlook 2000 SR-1 (9.0.0. 4527) Help File, or or before Aug. 10, 2001, p. 1.
"Set up LDAP directory services," Outlook 2000 SR-1 (i.0.0. 4527) Help File, on or before Aug. 10, 2001, p. 1.
"Look up contact information from an item," Outlook 2000 SR-1 (9.0.0. 4527) Help File, on or before Aug. 10, 2001, p. 1.
J.C. Cannon, "Design Guide for Directory-Enabled Applications," [online], Apr. 2001 [retrieved on May 13, 2003]. Retrieved from the Internet http://msdn.microsoft.com/library/enus/dnactdir/html/BuildingADApps.asp?frame=true, pp. 1-9.
Microsoft Corporation, "Using ADSI, LDAP, and Network Management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.
Microsoft Corporation, "Comparing Microsoft Active Directory to Novell's NDS," [online], Sep. 1998 [retrieved on May 13, 2003]. Retrieved from the Internet http://msdn.microsoft-com/library/enus/dnactdir/html/msdn_activedirvsnds.asp?frame=true, pp. 1-17.
Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/hmtl/msdn_adsiexch.asp?frame=true, pp. 1-12.
"Active Directory Service Overview," [online], Nov. 30, 2001 [retrieved on May 13, 2003]. Retrieved from the Internet http://www.microsoft.com/windows2000/server/evaluation/business/-ad-datasheet.asp, pp. 105.
"Integrating Microsoft Metadirectory Services and Active Directory," [online], Aug. 31, 2000 [retrieved on May 13, 2003]. Retrieved from the Internet http://www.microsoft.com/windows2000/-server/evaluation/business/adwin2k.asp, p. 1.

"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2k.asp, pp. 1-9.
"Active Directory," [online], retrieved on May 13, 2003]. Retrieved from the Internet http://www.microsoft.com/windows2000/technologies/directory/AD/default.asp, pp. 1-13.
Microsoft Corporation, "Introduction to Active Directory Application Mode," Microsoft Windows Server 2003, Aug. 2002, pp. 1-13.
"Active Directory Features," [online], Jun. 15, 1999 [retrieved on May 13, 2003]. Retrieved from the Internet http://www.microsoft.com/windows2000/server/evaluation/features/adlist.asp, pp. 1-4.
"Windows 2000 Directory Services," [online], [retrieved on May 13, 2003]. Retrieved from the Internet http://www.microsoft.com/windows2000/technologies/directory/default.asp, pp. 1-2.
"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp, pp. 1 of 4.
William R. Stanek, Microsoft Windows 2000 Administrator's Pocket Consultant [online]. Microsoft Corporation, 1999 [retrieved on May 8, 2003]. Retrieved from the Internet <http://www.microsoft.-com/technet/prodtechnol/ad/windows2000/evaluate/05w2kada.asp?fr...>, pp. 1-6.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra...>, pp. 1-16.
William R. Stanek, Microsoft Windows 2000 Administrator's Pocket Consultant [online]. Microsoft Corporation, 1999 [retrieved on May 8, 2003}. Retrieved from the Internet <http://www.microsoft.com/technet/prodtechnol/ad/windows2000/evaluate/05w2kadb.asp?fra...>, pp. 1-10.
"Integrating Applications with Windows 2000 and Active Directory," [online], Oct. 2000 [retrieved on May 8, 2003]. Retrieved from the Internet <http://www.microsoft.com/technet/-prodtechnol/ad/windows2000/evaluate/adappstr.asp?fra...>, pp. 1-12.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"The LP Wireless Messenger", Messenger Documentation, [online]. LP Wireless, Inc., 2001 [retrieved on Nov. 2, 2002]. Retrieved from the Internet <http://www.lpwireless.com/messengerhelp.htm>, pp. 1-7.
Mckendrick, Joseph, "Internet Call Centers: New Era in Customer Service", EC World, Feb. 2002, vol. 10, n2, pp. 22-25.
Office Action, U.S. Appl. No. 10/184,002, dated Jan. 9, 2007, 16 pages.
Office Action, U.S. Appl. No. 10/146,814, dated Jul. 2, 2007, 18 pages.
European Search Report mailed Aug. 30, 2005 for European Application No. 03731244.
Office Action, U.S. Appl. No. 10/146,814, dated Apr. 15, 2008, 21 pages.
"AOL Instant Messenger All New Version 2.0", 2 pages, Jun. 24, 1999.
"Frequently Asked Questions About AOL Instant Messenger", 6 pages, Jun. 24, 1999.
"Introducing the Gordano Messaging Suite"; http://www.gordano.com; Copyright 1994-2003 Gordano.
"New Features in AOL Instant Messenger for Windows v. 2.01 Beta", 2 pages, Apr. 28, 1999.
"Quick Tips for Getting Started", 5 pages, Jun. 24, 1999.
"Using Active Directory Service", from Chapter 5, *Microsoft Windows 2000 Administrator's Pocket Consultant*, by William R. Stank (1999). Retrieved from http://www.microsoft.com/technet/prodtechnol/ad/windows2000/evaluate/05/w2kadb.asp?fr..., pp. 1-6.
"What is AOL Instant Messenger", 3 pages, Jun. 24, 1999.
"Windows 2000 Directory Services", [online] http://www.mircrosoft.com/windows2000/technologies/directory/default.asp, as of Nov. 25, 2001 according to Internet Archive Wayback Machine, available at http://web.archive.org/web20011625224156/http://www.microsoft.com/windowns2000/technologies/directory/default.asp. 1 page.

"Working with Active Directory Domains", from Chapter 5, *Microsoft 2000 Adminstrator's Pocket Consultant*, by William R. Stank (1999). Retrieved from http://www.microsoft.com/technet/prodtechnol/ad/windows2000/evaluate/05w2kadb.asp?fr..., pp. 1-10.

International Search Report and Written Opinion dated Feb. 15, 2006 for International Application No. PCT/US05/07204, 10 pages.

Notice of Allowance for U.S. Appl. No. 10/184,002, dated Jul. 24, 2008, 20 pages.

Office Action issued in U.S. Appl. No. 10/981,460, dated Aug. 20, 2008, 24 pages.

Office Action issued in U.S. Appl. No. 10/134,437, dated Mar. 10, 2009, 31 pages.

Office Action issued in U.S. Appl. No. 10/334,056, dated Jul. 6, 2005, 24 pages.

Office Action issued in U.S. Appl. No. 10/334,056, dated May 10, 2007, 7 pages.

Office Action issued in U.S. Appl. No. 10/334,056, dated May 12, 2008, 22 pages.

Office Action issued in U.S. Appl. No. 10/334,056, dated May 21, 2007, 7 pages.

Office Action issued in U.S. Appl. No. 10/334,056, dated Nov. 29, 2004, 22 pages.

Office Action issued in U.S. Appl. No. 10/334,056, dated Nov. 5, 2007, 21 pages.

Office Action issued in U.S. Appl. No. 10/334,056, dated Oct. 31, 2005, 7 pages.

Office Action issued in U.S. Appl. No. 11/015,424, dated Mar. 19, 2008, 43 pages.

Office Action issued in U.S. Appl. No. 11/015,424, dated Nov. 3, 2008, 49 pages.

Office Action issued in U.S. Appl. No. 11/017,204 dated Jun. 23, 2008, 33 pages.

Office Action issued in U.S. Appl. No. 11/017,204, dated Dec. 12, 2007, 13 pages.

Office Action issued in U.S. Appl. No. 11/238,110 dated Jul. 9, 2008, 11 pages.

Office Action issued in U.S. Appl. No. 11/238,110 dated Oct. 9, 2008, 12 pages.

Office Action issued in U.S. Appl. No. 11/238,110, dated Nov. 29, 2007, 11 pages.

Office Action issued in U.S. Appl. No. 11/238,129 dated May 28, 2008, 70 pages.

Office Action issued in U.S. Appl. No. 11/238,129 dated Nov. 14, 2007, 35 pages.

Office Action issued in U.S. Appl. No. 11/238,130 dated Apr. 14, 2009, 35 pages.

Office Action issued in U.S. Appl. No. 11/238,130 dated Nov. 13, 2008, 45 pages.

Office Action issued in U.S. Appl. No. 10/184,002, dated Jan. 8, 2008, 19 pages.

Office Action issued in U.S. Appl. No. 10/134,437 dated Sep. 18, 2008, 32 pages.

Examiner's Answer mailed Jan. 10, 2008 by USPTO in U.S. Appl. No. 09/810,159, 11 pages.

Final Office Action mailed Apr. 29, 2005, from U.S. Appl. No. 09/911,799 (15 pages).

Final Office Action mailed Apr. 29, 2008, from U.S. Appl. No. 10/747,697 (23 pages).

Final Office Action mailed Aug. 11, 2006, from U.S. Appl. No. 09/911,799 (12 pages).

Final Office Action mailed Aug. 21, 2007, from U.S. Appl. No. 10/747,623 (17 pages).

Final Office Action mailed Jun. 23, 2008, from U.S. Appl. No. 10/747,623 (19 pages).

Final Office Action mailed Mar. 18, 2009, from U.S. Appl. No. 09/911,799 (28 pages).

Final Office Action mailed Nov. 1, 2007, from U.S. Appl. No. 10/747,624 (17 pages).

Information Disclosure Statement dated Apr. 11, 2007 in U.S. Appl. No. 10/146,814.

Information Disclosure Statement dated Apr. 15, 2002 in U.S. Appl. No. 09/810,159.

Information Disclosure Statement dated Aug. 17, 2006 in U.S. Appl. No. 10/146,814.

Information Disclosure Statement dated Aug. 2, 2007 in U.S. Appl. No. 10/134,437.

Information Disclosure Statement dated Aug. 3, 2007 in U.S. Appl. No. 10/184,002.

Information Disclosure Statement dated Dec. 10, 2004 in U.S. Appl. No. 10/134,437.

Information Disclosure Statement dated Dec. 21, 2005 in U.S. Appl. No. 10/134,437.

Information Disclosure Statement dated Dec. 3, 2007 in U.S. Appl. No. 10/146,814.

Information Disclosure Statement dated Feb. 6, 2003 in U.S. Appl. No. 10/134,437.

Information Disclosure Statement dated Feb. 8, 2007 in U.S. Appl. No. 10/134,437.

Information Disclosure Statement dated Feb. 9, 2007 in U.S. Appl. No. 10/146,814.

Information Disclosure Statement dated Jan. 23, 2007 in U.S. Appl. No. 10/134,437.

Information Disclosure Statement dated Jul. 16, 2007 in U.S. Appl. No. 09/911,799.

Information Disclosure Statement dated Jul. 19, 2007 in U.S. Appl. No. 10/134,437.

Information Disclosure Statement dated Jul. 25, 2006 in U.S. Appl. No. 09/810,159.

Information Disclosure Statement dated Jul. 29, 2003 in U.S. Appl. No. 10/134,437.

Information Disclosure Statement dated Jul. 30, 2002 in U.S. Appl. No. 09/810,159.

Information Disclosure Statement dated Jun. 10, 2003 in U.S. Appl. No. 10/146,814.

Information Disclosure Statement dated Jun. 22, 2005 in U.S. Appl. No. 10/134,437.

Information Disclosure Statement dated Jun. 26, 2008 in U.S. Appl. No. 09/843,788.

Information Disclosure Statement dated Jun. 30, 2004 in U.S. Appl. No. 09/843,788.

Information Disclosure Statement dated Jun. 4, 2002 in U.S. Appl. No. 09/843,788.

Information Disclosure Statement dated Mar. 21, 2005 in U.S. Appl. No. 09/810,159.

Information Disclosure Statement dated Mar. 22, 2004 in U.S. Appl. No. 10/134,437.

Information Disclosure Statement dated Mar. 27, 2003 in U.S. Appl. No. 10/134,437.

Information Disclosure Statement dated May 12, 2004 in U.S. Appl. No. 09/810,159.

Information Disclosure Statement dated May 31, 2007 in U.S. Appl. No. 10/146,814.

Information Disclosure Statement dated May 9, 2002 in U.S. Appl. No. 09/848,232.

Information Disclosure Statement dated May 9, 2007 in U.S. Appl. No. 10/184,002.

Information Disclosure Statement dated Nov. 14, 2003 in U.S. Appl. No. 10/134,437.

Information Disclosure Statement dated Nov. 18, 2004 in U.S. Appl. No. 09/848,232.

Information Disclosure Statement dated Nov. 29, 2005 in U.S. Appl. No. 10/134,437.

Information Disclosure Statement dated Nov. 29, 2007 in U.S. Appl. No. 10/134,437.

Information Disclosure Statement dated Oct. 7, 2005 in U.S. Appl. No. 09/843,788.

Information Disclosure Statement dated Sep. 17, 2004 in U.S. Appl. No. 10/134,437.

Information Disclosure Statement dated Sep. 29, 2005 in U.S. Appl. No. 09/843,788.

Information Disclosure Statement dated Jul. 19, 2007 in U.S. Appl No. 09/843,788.
Information Disclosure Statement dated May 12, 2004 in U.S. Appl. No. 09/911,799.
International Search Report and Written Opinion dated Feb. 15, 2006 for International Application No. PCT/US05/07204, 14 pages.
International Search Report and Written Opinion for PCT Application No. PCT/US2005/042992, Mar. 6, 2007 (14 pages).
International Search Report dated Oct. 16, 2006, for PCT/US05/08476, 9 pages.
International Search Report, Application No. PCT/US05/45663, dated Apr. 11, 2008, 10 pages.
International Search Report, Application No. PCT/US05/45663, dated Apr. 11, 2008, 6 pages.
International Search Report, Application No. PCT/US2006/018286, dated Oct. 19, 2006, 12 pages.
Non-final Office Action from U.S. Appl. No. 09/810,159 mailed Jan. 29, 2010, 16 pages.
Notice of Allowability in U.S. Appl. No. 10/134,437, 3 pages.
Notice of Allowance and Fee(s) Due in U.S. Appl. No. 10/134,437 dated Oct. 2, 2009, 3 pages.
Office Action issued on Jul. 3, 2007 by USPTO in U.S. Appl. No. 09/911,799.
Office Action dated Sep. 18, 2008, in U.S. Appl. No. 10/134,437.
Office Action issued on Jan. 8, 2008 by USPTO in U.S. Appl. No. 10/184,002.
Office Action issued on Jan. 11, 2008 by USPTO in U.S. Appl. No. 09/810,159.
Office Action issued on Jan. 12, 2009 by USPTO in U.S. Appl. No. 10/146,814.
Office Action issued on Jan. 29, 2010 by USPTO in U.S. Appl. No. 09/810,159.
Office Action issued on Feb. 11, 2005 by USPTO in U.S. Appl. No. 09/810,159.
Office Action issued on Feb. 11, 2008 by USPTO in U.S. Appl. No. 10/134,437.
Office Action issued on Feb. 26, 2007 by USPTO in U.S. Appl. No. 10/747,624.
Office Action issued on Mar. 10, 2009 by USPTO in U.S. Appl. No. 10/134,437.
Office Action issued on Mar. 13, 2007 by USPTO in U.S. Appl. No. 10/747,623.
Office Action issued on Mar. 18, 2010 by USPTO in U.S. Appl. No. 09/911,799.
Office Action issued on Mar. 22, 2010 by USPTO in U.S. Appl. No. 10/146,814.
Office Action issued on Mar. 28, 2006 by USPTO in U.S. Appl. No. 09/843,788.
Office Action issued on Mar. 30, 2004 by USPTO in U.S. Appl. No. 09/843,788.
Office Action issued on Apr. 2, 2009 by USPTO in U.S. Appl. No. 11/237,718.
Office Action issued on Apr. 15, 2008 by USPTO in U.S. Appl. No. 10/146,814.
Office Action issued on Apr. 19, 2006 by USPTO in U.S. Appl. No. 09/810,159.
Office Action issued on Apr. 19, 2007 by USPTO in U.S. Appl. No. 09/843,788.
Office Action issued on Apr. 20, 2006 by USPTO in U.S. Appl. No. 10/184,002.
Office Action issued on Apr. 29, 2005 by USPTO in U.S. Appl. No. 09/911,799.
Office Action issued on Apr. 29, 2008 by USPTO in U.S. Appl. No. 10/747,679.
Office Action issued on May 5, 2010 by USPTO in U.S. Appl. No. 09/843,788.
Office Action issued on May 18, 2006 by USPTO in U.S. Appl. No. 10/134,347.
Office Action issued on May 22, 2006 by USPTO in U.S. Appl. No. 10/146,814.
Office Action issued on Jun. 12, 2006 by USPTO in U.S. Appl. No. 09/843,788.
Office Action issued on Jun. 15, 2005 by USPTO in U.S. Appl. No. 09/810,159.
Office Action issued on Jun. 23, 2008 by USPTO in U.S. Appl. No. 10/747,623.
Office Action issued on Jul. 2, 2007 by USPTO in U.S. Appl. No. 10/146,814.
Office Action issued on Jul. 6, 2004 by USPTO in U.S. Appl. No. 09/810,159.
Office Action issued on Jul. 16, 2007 by USPTO in U.S. Appl. No. 10/747,624.
Office Action issued on Jul. 27, 2005 by USPTO in U.S. Appl. No. 09/843,788.
Office Action issued on Aug. 4, 2010 by USPTO in U.S. Appl. No. 12/336,880.
Office Action issued on Aug. 11, 2006 by USPTO in U.S. Appl. No. 09/911,799.
Office Action issued on Aug. 21, 2006 by USPTO in U.S. Appl. No. 10/134,437.
Office Action issued on Aug. 21, 2007 by USPTO in U.S. Appl. No. 10/747,623.
Office Action issued on Aug. 25, 2005 by USPTO in U.S. Appl. No. 10/184,002.
Office Action issued on Sep. 6, 2007 by USPTO in U.S. Appl. No. 10/134,437.
Office Action issued on Sep. 15, 2008 by USPTO in U.S. Appl. No. 09/843,788.
Office Action issued on Sep. 18, 2008 by USPTO in U.S. Appl. No. 10/134,437.
Office Action issued on Sep. 20, 2005 by USPTO in U.S. Appl. No. 10/146,814.
Office Action issued on Oct. 2, 2007 by USPTO in U.S. Appl. No. 10/747,679.
Office Action issued on Oct. 31, 2007 by USPTO in U.S. Appl. No. 09/843,788.
Office Action issued on Nov. 1, 2005 by USPTO in U.S. Appl. No. 10/134,437.
Office Action issued on Nov. 11, 2007 by USPTO in U.S. Appl. No. 10/747,624.
Office Action issued on Nov. 14, 2007 by USPTO in U.S. Appl. No. 10/747,623.
Office Action issued on Nov. 17, 2005 by USPTO in U.S. Appl. No. 09/911,799.
Office Action issued on Nov. 17, 2009 by USPTO in U.S. Appl. No. 10/134,437.
Office Action issued on Dec. 2, 2004 by USPTO in U.S. Appl. No. 09/843,788.
Office Action issued on Dec. 2, 2005 by USPTO in U.S. Appl. No. 09/810,159.
Office Action issued on Dec. 11, 2006 by USPTO in U.S. Appl. No. 10/146,814.
Office Action mailed Feb. 26, 2007, from U.S. App. No. 10/747,624 (15 pages).
Office Action mailed Jul. 3, 2007, from U.S. App. No. 09/911,799 (18 pages).
Office Action mailed Mar. 13, 2007, from U.S. App. No. 10/747,623 (18 pages).
Office Action mailed Mar. 18, 2010, from U.S. Appl. No. 09/911,799 (6 pages).
Office Action mailed Nov. 14, 2007, from U.S. Appl. No. 10/747,623 (18 pages).
Office Action mailed Nov. 17, 2005, from U.S. Appl. No. 09/911,799 (11 pages).
Office Action mailed Oct. 2, 2007, from U.S. Appl. No. 10/747,679 (33 pages).
Office Action mailed Oct. 5, 2004, from U.S. Appl. No. 09/911,799 (12 pages).
Office Action of Dec. 1, 2008, from U.S. Appl. No. 09/911,799 (8 pages).
Office Action of U.S. Appl. No. 10/134,437, dated Mar. 10, 2009, 31 pages.
Office Action of U.S. Appl. No. 10/184,002, dated Jan. 8, 2008, 19 pages.

Office Action of U.S. Appl. No. 11/015,424, dated Mar. 19, 2008, 43 pages.
Office Action of U.S. Appl. No. 11/015,424, dated Mar. 19, 2008, 60 pages.
Office Action of U.S. Appl. No. 11/015,424, dated May 9, 2009, 47 pages.
Office Action of U.S. Appl. No. 11/237,718, dated Apr. 2, 2009, 20 pages.
Office Action of U.S. Appl. No. 11/238,130, dated Apr. 14, 2009, 35 pages.
Office Action of U.S. Appl. No. 11/238,130, dated Jul. 3, 2008, 22 pages.
Office Action of U.S. Appl. No. 11/238,130, dated Nov. 13, 2008, 45 pages.
Office Action of U.S. Appl. No. 09/911,799 dated Jul. 3, 2007, 18 pages.
Office Action of U.S. Appl. No. 10/134,437, dated Feb. 11, 2008, 34 pages.
Office Action of U.S. Appl. No. 10/184,002 dated Jan. 9, 2007, 16 pages.
Office Action of U.S. Appl. No. 10/747,623, dated Mar. 13, 2007, 50 pages.
Office Action of U.S. Appl. No. 10/747,623, dated Nov. 14, 2007, 18 pages.
Office Action of U.S. Appl. No. 10/747,624, dated Feb. 26, 2007, 19 pages.
Office Action of U.S. Appl. No. 11/150,180, dated Oct. 2, 2007, 22 pages.
PCT International Search Report of Apr. 11, 2003, App. No. PCT/US00/35160 (3 pages).
PCT International Search Report of Jan. 9, 2003, App. No. PCT/US02/30730 (5 pages).
USPTO, Final Office Action of May 18, 2006, U.S. Appl. No. 10/134,437 (26 pages).
USPTO, Final Office Action of Nov. 24, 2009, U.S. Appl. No. 11/238,130 (26 pages).
USPTO, Final Office Action of Nov. 3, 2008, U.S. Appl. No. 10/015,424 (46 pages).
USPTO, Final Office Action of Oct. 19, 2009, U.S. Appl. No. 10/015,424 (59 pages).
USPTO, Final Office Action of Oct. 30, 2009, U.S. Appl. No. 11/237,718 (21 pages).
USPTO, Office Action of Apr. 20, 2006, U.S. Appl. No. 10/184,002 (15 pages).
USPTO, Office Action of Aug. 25, 2005, U.S. Appl. No. 10/184,002 (13 pages).
USPTO, Office Action of Nov. 1, 2005, U.S. Appl. No. 10/134,437 (21 pages).
"A Countermeasure to Duplicate-detecting Anti-spam Techniques," Robert J. Hall, AT&T Labs Technical Report 99.9.1, 1999, Abst. and pp. 1-26.
"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"AOL Instant Messenger", reprinted from http://web.archive.org/web/20010721193059/http://aim.com/ (Way Back Machine—available on Jul. 21, 2001) on Aug. 26, 2005, 7 pages.
"BestCalls.com Announces the BestCalls Technology Index," Business Wire, Jun. 30, 1999, Business Wire, p. 1.
"Better Bayesian Filtering," Paul Graham, Jan. 2003, pp. 1-11 http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery.com/idea/Degrees_20of_20Separation_20Email_20Protecti . . . printed on Mar. 1, 2004 (3 pages).
"Digital Artifacts for Remembering and Storytelling: Post History and Social Network Fragments," Viegas et al., retrieved from World Wide Web: http://we.media.mit.edu/~fviecias/papers/posthistory_snf.pdf, 10 total pages (Jan. 2004).
"Finding Others Online: Reputation Systems for Social Online Spaces," Jensen et al., Apr. 20-25, 2002, CHI, Minneapolis, Minnesota, vol. 4, Issue 1, pp. 447-454.
"GLWebMail 2.0 is released!" http://www.gordano.com; available on Apr. 18, 2001, reprinted from http://web.archive org/web/20010418153714//http://www.gordano.com.
"Hottie or Nottie? Web Site Voters Let You Know Whether You Sizzle or Fizzle," Marino, Jul. 11, 2001, Florida Times Union, p. C. 1, 2 pages.
"Icq.anywhere, Email Features—Email Center—ICQ.com," retrieved Apr. 29, 2004 from the World Wide Web: http://www.ico.com/email/popular-features.html pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnlx=0&adxnnlx=107029 . . . , printed on Nov. 5, 2004 (3 pages).
"Instant Messaging for Gamers," PC Gamer, May 2004, vol. 11, No. 5, p. 28.
"Internet Call Centers: New Era in Customer Service", Joseph McKendrick, Aug. 18, 2005.
"Learning Spam: Simple Techniques for Freely-Available Software," Bart Massey et al, Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., University of Athens, Sep. 2000, pp. 1-12.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"PieSpy—Inferring and Visualizing Social Network on IRC," PieSpy Social Network Bot, reprinted from http://lister.linux-srv.anix.net/piespy printed on Mar. 11, 2004 (18 pages).
"plaxo," Plaxo, reprinted from http://web.archive.org/web/20041105072256/http://www.pfaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Reflections on Friendster, Trust and Intimacy," Danah Boyd. *Ubicomp* 2003, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"Rim Road: Software: Internet & Network: Webmessenger RIM J2ME/Instant Messaging," retrieved Apr. 29, 2004 from the World Wide Web: http://www.rimrod.com/software/rim1/Webmessenger-RIM-J2ME-Instant-Messaging-20 . . . , pp. 1-4.
"Six Degrees—New Programs Help Companies 'Mine Workers' Relationships for Key Business Prospects," William M. Bulkeley et al., Marketplace, The Wall Street Journal, Aug. 4, 2003 (3 pages).
"Social Nets Find Friends in VCs." Joanna Glasner. http://www.wired.com/news, Nov. 17, 2003, pp. 1-3.
"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003.
"Social Networking for Business: Release 0.5," Esther Dyson, Esther Dyson's Monthly Report, vol. 21, No. 10, Nov. 25, 2003, www.edventure.com. (36 pages).
"Social Networks: Deodorant for the Soul?," Esther Dyson, Esther Dyson's Monthly Report, vol. 21, No. 11, Dec. 12, 2003, www.edventure.com (36 pages).
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.
"Socialware: Multiagent Systems for Supporting Network Communities," Hattori et al., Mar. 1999, Association for Computing Machinery, Communications of the ACM, vol. 42, Issue 3, pp. 55ff.

"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).

"Support Vector Machines for Spam Categorization," Harris Drucker et al., IEEE Transactions on Neural Networks, vol. 10, No. 5, Sep. 1999, pp. 1048-1054.

"Support Vector Machines," Marti Hearst, IEEE Intelligent Systems, Jul./Aug. 1998, pp. 18-28.

"SVM-based Filtering of E-mail Spam with Content-specific Misclassification Costs," Aleksander Kolcz et al., *TextDM'2001 (IEEE ICDM-2001 Workshop on Text Mining)*, San Jose. CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, p. D.1.

"Technical Solutions for Controlling Spam," Shane Hird, Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

"Telstra targets Net spammers," J. Dudley, news.com.au, Dec. 2, 2003, 2 pages.

"Text Categorization with Support Vector Machines: Learning with Many Relevant Features," Thorsten Joachims, University of Dortmund, Computer Science Dept., LS-8 Report 23, 1998, 18 pages.

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"The LP Wireless Messenger", Messenger Documentation, http://www.lpwireless.com/messengerhelp.htm, pp. 1-7. available on Dec. 9, 2002, reprinted from http://web.archive.org/web20021209025321/http//lpwireless.com/messengerhelp-htm.

Trillian Discussion Forums—HOWTO: import ICQ 2003a Contact List,* retrieved Apr. 29, 2004 from the World Wide Web: http://trillian.cc/forums/showthread.php?s+&threadid=36475 pp. 1-2.

"Welcome to Huminity World of Connections," Huminity-Home, reprinted from http://web.archive.org/web/20030228131435/www.huminity.com/default.php?internationa . . . printed on Nov. 5, 2004 (available on Feb. 2, 2003) (1 page).

"Will You Buy a Car From This Man?," Leander Kahney, Oct. 6, 2003. pp. 1-3.

"Windows NetMeeting—Features", [Online], Jun. 17, 1999, XP002245623, Retrieved from the Internet: URL:http://www.microsoft.com/windows/NetMeeting/Features/default.ASP>, 8 pages.

Anand Ranganalhan et al., "ConChat: A Context-Aware Chat Program", 2002, Pervasive Computing, pp. 51-57.

Announce: Implementation of E-mail Spam Proposal, Maurice I. Marvin, news.admin.net-abuse.misc, Aug. 3, 1996, 2 pages.

Anonymous: "Push to Talk™ Services", Internet Document, [Online], p. 1, Retrieved from the Internet: URL:http://www.nextel.com/services/directconnect/ptt_overview.shtml [retrieved on Dec. 29, 2003].

Anonymous: "The Internet—the Advent of New Forms of Communication", Internet Document, [Online], pp. 1-4, Retrieved from the Internet: URL:http://journal.fujitsu.com/248e/e48now.html [retrieved on Dec. 29, 2003].

Archive.org archived "AOL Instant Messenger," [online] Jul. 21, 2001 [from file of U.S. Appl. No. 09/911,799] (7 pages).

Archive.org archived the Morpheus 1.9.1 download page on c|net Download.com [online] Aug. 3, 2002 [accessed Feb. 14, 2007], Retrieved from Internet, URL:http://web.archive.org/web/20020803071751/download.com.com/3000-2166-10057840.html>.

Archive.org archived the Morpheus 1.9.1 download page on c|net Download.com [online] Oct. 8, 2001 [from file of U.S. Appl. No. 09/911,799] (2 pages).

Australian Office Action of Apr. 7, 2006, App. No. 2002340039 (2 pages).

BuddyGopher~About, available on Jul. 13, 2004, reprinted from http://web.archive.org/web/20040713002836/www.buddygopher.com/about.html on Sep. 28, 2005 (4 pgs).

BuddyGopher-We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Canadian Office Action from Application Serial No. 2,403,520, dated Feb. 21, 2005.

Carlos Jensen et al., "Finding Others Online: Reputation Systems for Social Online Spaces", Apr. 2002, Paper: Group Spaces, pp. 447-454.

Chinese Office Action of Jul. 7, 2006, App. No. 02821420X (5 pages).

International Search Report mailed Aug. 30, 2005 for International Application No. EP03731244.

Office Action mailed approximately Feb. 29, 2006 for Japanese Patent Application No. 2002515026 (6 pages).

Supplementary European Search Report issued in European Application No. EP05728303, dated Jan. 9, 2009, (2 pages).

Courter et al., "Mastering Microsoft Outlook 2000 Premium Edition", Sybex Inc., Alameda, California, 2000, pp. 167-169, ISBN 0-7821-2676-6.

CrushParty.com: Help, retrieved Jun. 12, 2002 from the World Wide Web: http://www.crushparty.com/help.jsp, 3 pages.

Dodgeball.com: mobile social software, "help: text messaging", available on Oct. 13, 2004, reprinted from http://web.archive.org/web/20041013034241/www.dodgeball.com/social/help_text.php on Sep. 28, 2005 (3 pgs).

Dodgeball.com: mobile social software, "help: the basics", available on Oct. 9, 2004, reprinted from http://web.archive.org/web/20041009200739/www.dodgeball.com/social/help_basics.php on Sep. 28, 2005 (2 pgs.)

Dodgeball.com: mobile social software, "help: use it", available on Oct. 9, 2004, reprinted from http://web.archive.org/web/20041009201853/www.dodgeball.com/social/help_useit.php on Sep. 28, 2005 (2 pgs).

Dodgeball.com: mobile social software, "Hook up with friends. Discover what's around you", available on Nov. 30, 2003, reprinted from http://web.archive.org/web/20041130034344/www.dodgeball.com/social/index.php on Sep. 28, 2005 (2 pgs).

Dutta-Roy Amitava, "Virtual Meetings with Desktop Conferencing", IEEE Spectrum, vol. 35, No. 7, Jul. 1, 1998, pp. 47-56 and p. 66.

European Office Action in Application No. 01954931.0-2414, mailed Jul. 14, 2008, 3 pages.

European Patent Office, Communication of Aug. 30, 2005, App. No. 03731244.4-2416 (PCT/US0315715) (4 pages).

European Patent Office, Communication of Aug. 31, 2009, App. No. 02778374.5-1238 (8 pages).

European Patent Office, Communication of Sep. 5, 2006, App. No. 02778374.5-1238 (4 pages).

Gupta et al., "A Reputation System for Peer-to-Peer Networks," Jun. 1-3, 2003, NOSSDAV'03, California, pp. 144-152. Monterey.

Home-tribe.net, http://washingtondc.tribe.net/message/24434d1b-817b4580-aa42-3bffa15f26a?page=1 (4 total pages, reprinted on Dec. 13, 2004.

http://www.friendster.com (17 pages, reprinted on Dec. 13, 2004).

IBM "Configuring Sametime servers in your Domino environment" May 1, 2000 (14 pages).

Isaacs, Ellen: "Example UI Spec: Sound Instant Messages", Internet Document, [Online], pp. 1-2. Retrieved from the Internet: URL:http://www.uidesigns.com/spec/d-sims.html [retrieved on Jun. 26, 2003].

J.C. Cannon, "Design Guide for Directory-Enabled Applications," [online], Apr. 2001 [retrieved on May 13, 2003]. Retrieved from the Internet http://msdn.microsoft.com/library/en-us/dnactdir/html/deal.asp?frame=true>, pp. 1-18.

Japanese Office Action of May 12, 2008, App. No. 2003-533140 (5 pages).

Klaus Hartenstein et al., "xhtalk 2.9", © Nov. 1992, 6 pages.

Lotus Sametime 1.5 1999 (4 pages).

Mariano, Gwendolyn. ZDNetNews. "Morpheus 1.9 to be unleashed", [online] Jun. 10, 2002 [accessed Feb. 14, 2007]. Retrieved from Internet URL:http://news.zdnetcom/2100-3513_22-934615.html.

Mary Beth Marklein, "Student have 'away' with words", Mar. 28, 2004, USA Roday http://www.usatoday.com/tech/news/2004-03-28-aways-messactes-usat_x.htm, all pages.

Matsumoto, Tatsuro et al.: "Chocoa Communicator—A New Communication System Based on Awareness and Text Communications—", Fujitsu Sci. Tech. J.,36,2, pp. 154-161, Dec. 2000.

Maurice L. Marvin, "Announce: Implementation of E-mail Spam Proposal," news.admin.net-abuse.misc, Aug. 3, 1996, 2 pages.

Mckendrick, Joseph; "Internet Call Centers: New Era in Customer Service", Feb. 2002; V10, n2, pp. 22(4).

Mike Snider, "America goes online for New Year's bash", USA Today, p. 3D, Jan. 2, 2000.

Muller, Nathan, "Dial 1-800-Internet"; Feb. 1996, pp. 83-84, 86, 88.

Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.

Neo Mai, Ken Neo. "Buying and selling on the internet; [Computimes, 2* Edition]." New Straits Times. Kuala Lumpur: Jun. 28, 2001. p. 53.

Office Action of Canadian Application No. 2,462,037. dated Feb. 12, 2009 (8 pages).

PowWow (Mar. 1, 2000), Introduction, Retrieved Apr. 3, 2006 from website: http://web.archive.org/web/20000301125635/ww2.tribal.com/help/online_docs/h205voic.html.

Printer Rush (PTO Assistance) form dated Oct. 20, 2008.

Pruitt, Scarlet. IDG News Service. "Morpheus Updates Peer-to-Peer Client" [online] Jun. 10, 2002 [accessed Feb. 14, 2007], Retrieved from Internet URL:http://www.pcworld.com/article/id.101736/article.html.

Pruitt, Scarlet. IDG News Service. "Morpheus Updates Peer-to-Peer Client" [online] Jun. 20, 2002 [from file of U.S. Appl. No. 09/911,799] (3 pages).

R. Movva & W. Lai, "MSN Messenger Service 1.0 Protocol", Aug. 1999. Internet Draft. http://tools.ietf.org/id/draft-movva-msn-messenger-protocol-oo.txt, 28 pages.

Reichard, K., "AOL, ICQ to Interoperate—But in a Limited Fashion," Oct. 30, 2002, InstantMessagingPlanet, available at www.instantmessagingplanet.com/public/article.php/1490771, 4 pages.

Robert J. Hall, "A Countermeasure to Duplicate-detecting Anti-spam Techniques," AT&T Labs Technical Report 99,9.1, 1999, Abst and pp. 1-26.

Ryze home page, www.ryze.com, Dec. 21, 2003, available at http://web.archive.org/web/20031221010006/http://ryze.com, printed Mar. 16, 2005, 13 pages.

Satter, Michael, excerpts from Internet TV with CU-SeeMe, First Edition, including inside Title Page and Copyright Page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe User's Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, IN 46290, International Standard Book Number: 1-57521-006-1, Library of Congress Catalog Card Number: 95-70178, copyright© 1995.

Takashi Yoshino et al., "Namba: Location-Aware Collaboration System for Shopping and Meeting", Aug. 2002, IEEE Transactions on Consumer Electronics, pp. 470-477.

Tribal Voice, PowWow Guided Tour—Step 6, PowWow personal communication. http://web.archive.org/web/20000817094516/www.tribal.com/powwow/tour/step6.cfm (Oct. 22, 1999), 1 page.

VisiblePath webpages, www.visiblepath.org, Dec. 3, 2003, available at http://web.archive.org/web/20031203132211/http://www.visiblepath.com. printed Mar. 16, 2005, 5 pages.

Wayner, Peter, "Hey Baby, Call Me at My IP Address", Apr. 1996, pp. 142-144.

WBWE (1998), PowWow 3.6 Brings the Power of Internet Community to the People, Business Wire.

Windows 2000 Directory Services, [online], [retrieved on May 13, 2003]. Retrieved from the Internet <http://www.microsoft.com/windows2000/technologies/directory/default.asp>, p. 1-2.

Wingfield, N., "Technology Journal: Changing Chat—Instant Messaging Is Taking Off, and For some Users It's Nuzzling Out the Phone", Asian Wall Street Journal, New York, NY, Sep. 25, 2000, 5 pages.

Yubing Wang, Mark Claypool, Zheng Zuo. Video: An empirical study of realvideo performance across the internet. Proceedings of the 1st ACM SIGCOMM Workshop on Internet Measurement IMW'01. Nov. 2001. ACM Press. 15 pages.

ZeroDegrees home page, www-zerodegrees.com, Jan. 24, 2004, available at http://web.archive.org/web/20040204153037/www.zerodegrees.com/home.htm, printed Mar. 16, 2005, 2 pages.

U.S. Appl. No. 13/616,630, filed Sep. 14, 2012, Appelman.
U.S. Appl. No. 13/617,374, filed Sep. 14, 2012, Appelman.
U.S. Appl. No. 13/617,402, filed Sep. 14, 2012, Appelman.
U.S. Appl. No. 13/616,707, filed Sep. 14, 2012, Appelman.
U.S. Appl. No. 13/616,734, filed Sep. 14, 2012, Appelman.
U.S. Appl. No. 13/617,413, filed Sep. 14, 2012, Appelman.
U.S. Appl. No. 13/616,666, filed Sep. 14, 2012, Appelman.
U.S. Appl. No. 13/616,678, filed Sep. 14, 2012, Appelman.
U.S. Appl. No. 13/616,692, filed Sep. 14, 2012, Appelman.
U.S. Appl. No. 13/397,568, filed Feb. 15, 2012, Appelman.

* cited by examiner

PRESENTING A RECIPIENT OF AN E-MAIL WITH AN OPTION TO INSTANT MESSAGE A SENDER OR ANOTHER RECIPIENT BASED ON THE SENDER'S OR THE OTHER RECIPIENT'S ADDRESS AND ONLINE STATUS

This application is a continuation application of and claims priority to U.S. application Ser. No. 09/848,232 (now U.S. Pat. No. 6,912,546), filed May 4, 2001, which claims the benefit of U.S. Provisional Application No. 60/201,738 filed May 4, 2000, and U.S. Provisional Application No. 60/229,311 filed Sep. 1, 2000, all of which are incorporated by reference.

TECHNICAL FIELD

The present invention relates generally to a communications system and more particularly to a system for instant messaging the sender and recipients of an e-mail message.

BACKGROUND

Online service providers constantly are offering new services and upgrading existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place virtually in real time, instant messaging can provide immediate access to desired information. Instant messaging is becoming a preferred means of communicating among online subscribers.

SUMMARY

In one general aspect, transferring electronic data between users of a communications system includes using a host system structured and arranged to receive and deliver messages of various types between users of the communications system. The host system includes an instant messaging network, a mail gateway, and a configuring network in communication with both the instant messaging network and the mail gateway. The instant messaging network enables instant messaging communication between users of the communications system and is capable of monitoring whether a certain user is capable of receiving an instant message at a particular moment. The mail gateway receives and delivers e-mail messages to users of the communications system. The configuring network is dedicated to automatically configuring instant messaging communication between an intended recipient of an e-mail message and the sender of the e-mail message.

Implementations may include one or more of the following features. For example, the configuring network may send a redirection command to the recipient based on the capability of the sender to receive an instant message and/or may send a redirection command to the recipient based on the capability of another recipient of the e-mail message to receive an instant message. The redirection command may include a uniform resource locator.

The configuring network also may establish a persistent connection to the instant messaging network, check a control port to confirm whether the sender is capable of receiving an instant message, determine whether an e-mail address is associated with a recognized domain, and/or strip recognized domains from e-mail addresses.

The configuring network may have a look-up server for associating e-mail addresses with instant messaging screen names and/or a cache. The configuring network may detect whether information associated with an e-mail message is stored in the cache.

The mail gateway may include a send mail server for delivering electronic data to users, a read mail server for accessing electronic data, and/or a processing server for processing electronic data. The mail gateway may be web-based, online-service-provider based, and/or instant-messaging-host-based. The instant messaging network may be web-based and/or online-service-provider-based.

These and other aspects may be implemented by an apparatus and/or a computer program stored on a computer readable medium. The computer readable medium may be a disc, a client device, a host device, and/or a propagated signal.

DETAILED DESCRIPTION

For illustrative purposes, FIGS. 1-6 shows an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

Figure 1:
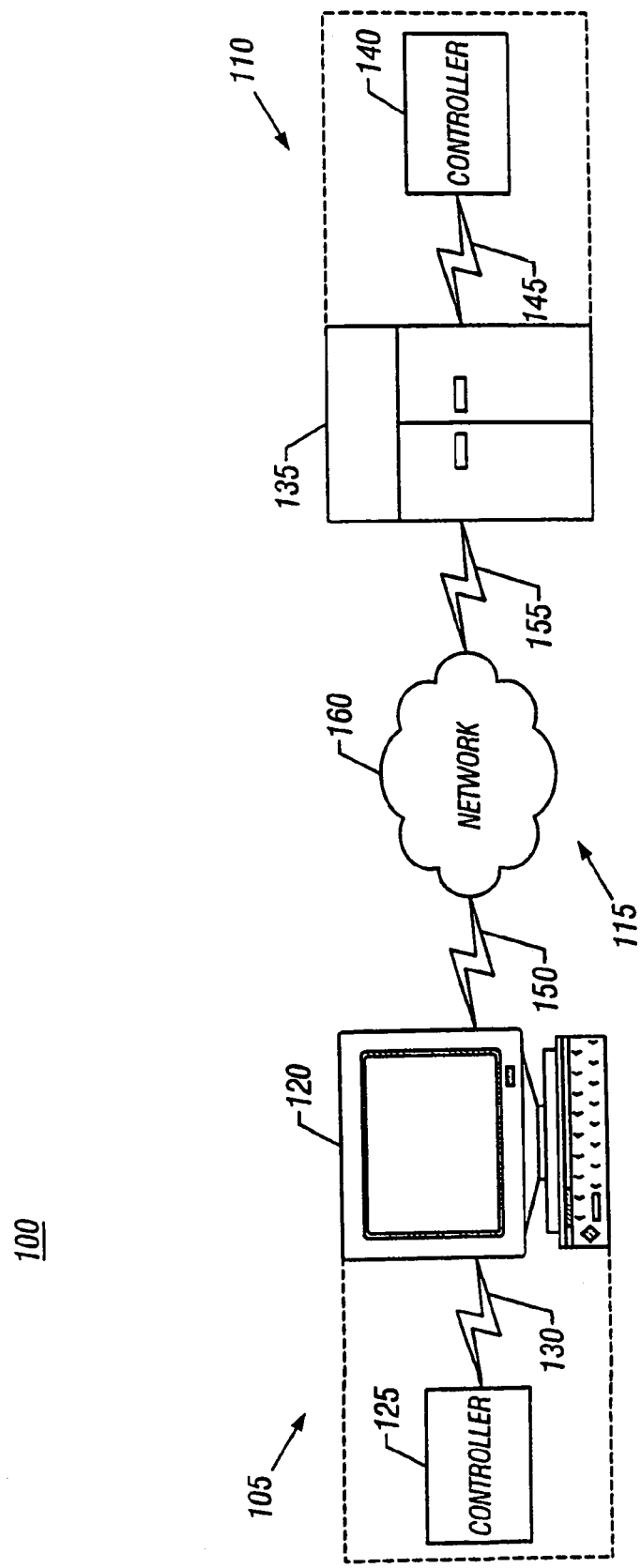
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host device 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically include one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions. The client device 120 and the host device 135 may include devices that are capable of peer-to-peer communications.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
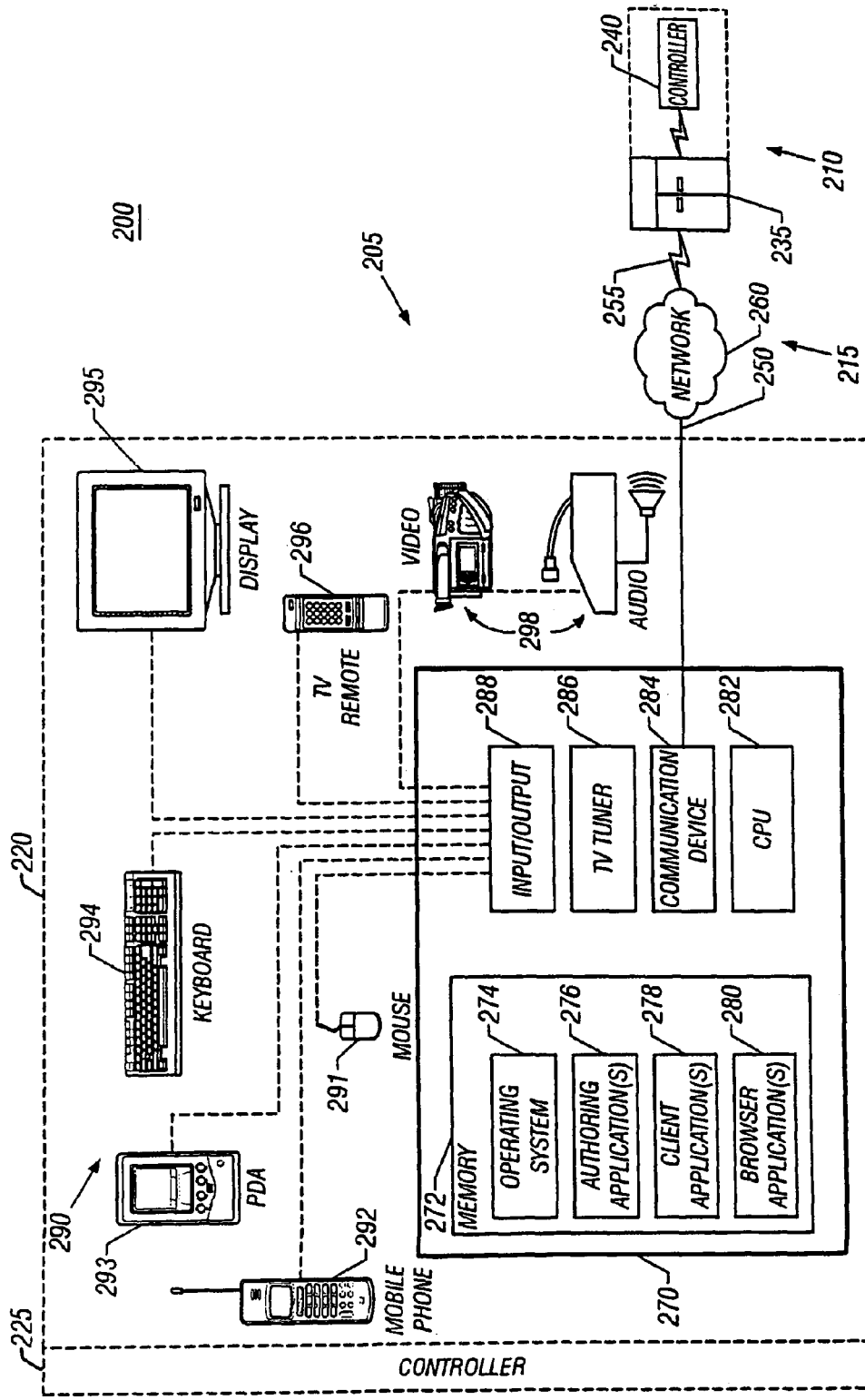
FIGS. 2-6 are expansions of aspects the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible implementation of the client system 105 of FIG. 1.

The client device 220 typically includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to subscribers, and an audiovisual input device 298.

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
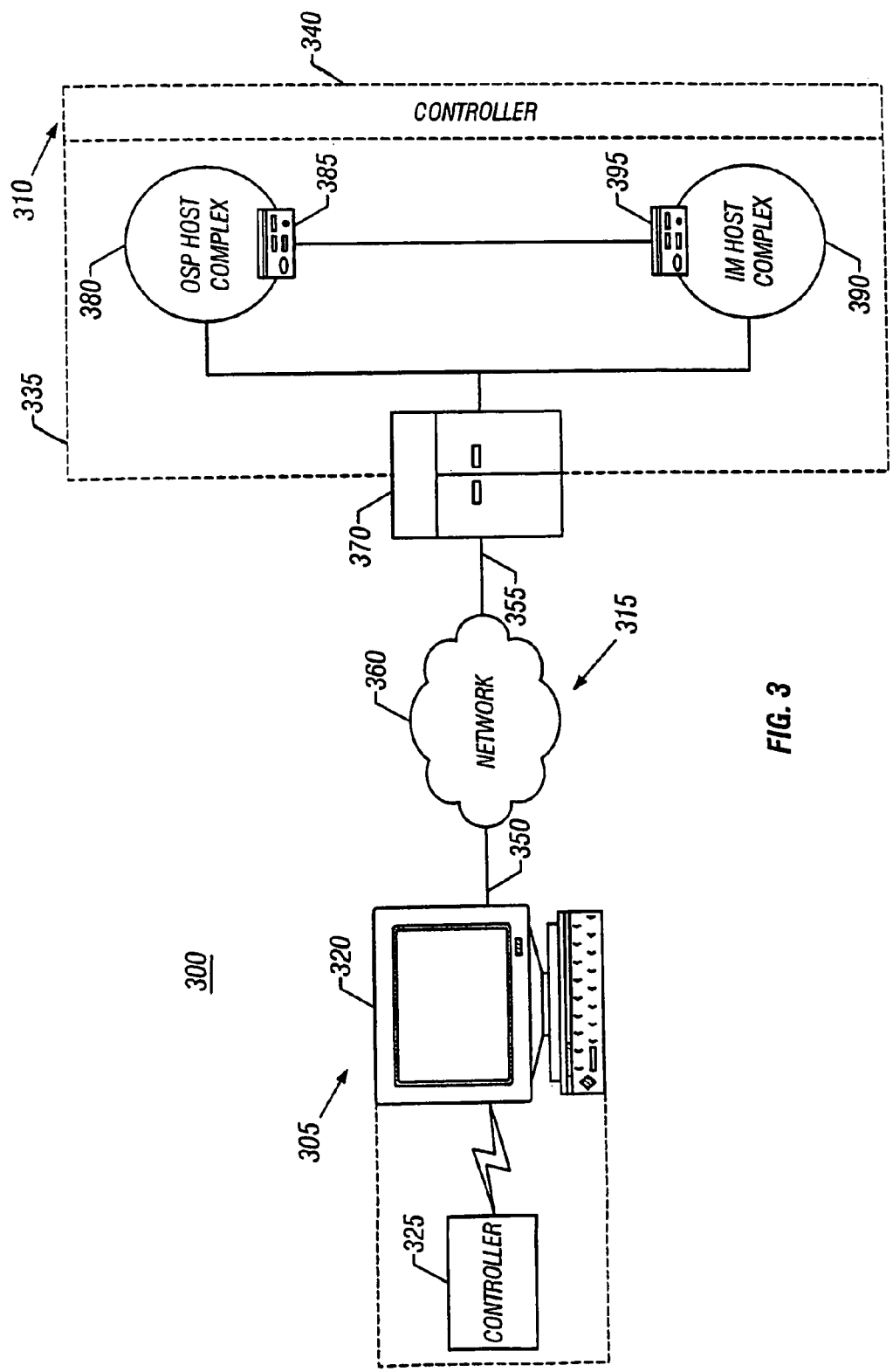

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
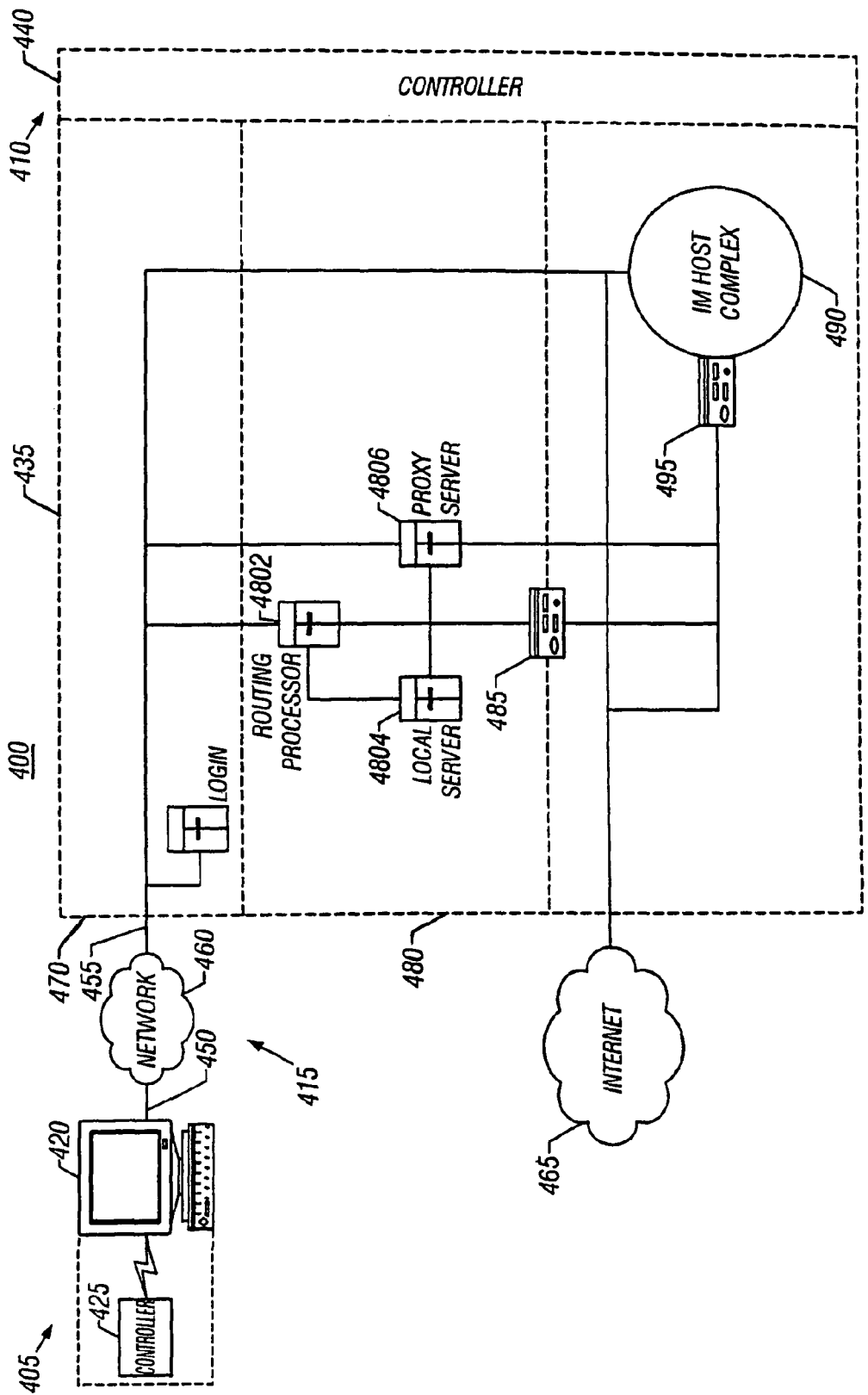

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include an L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
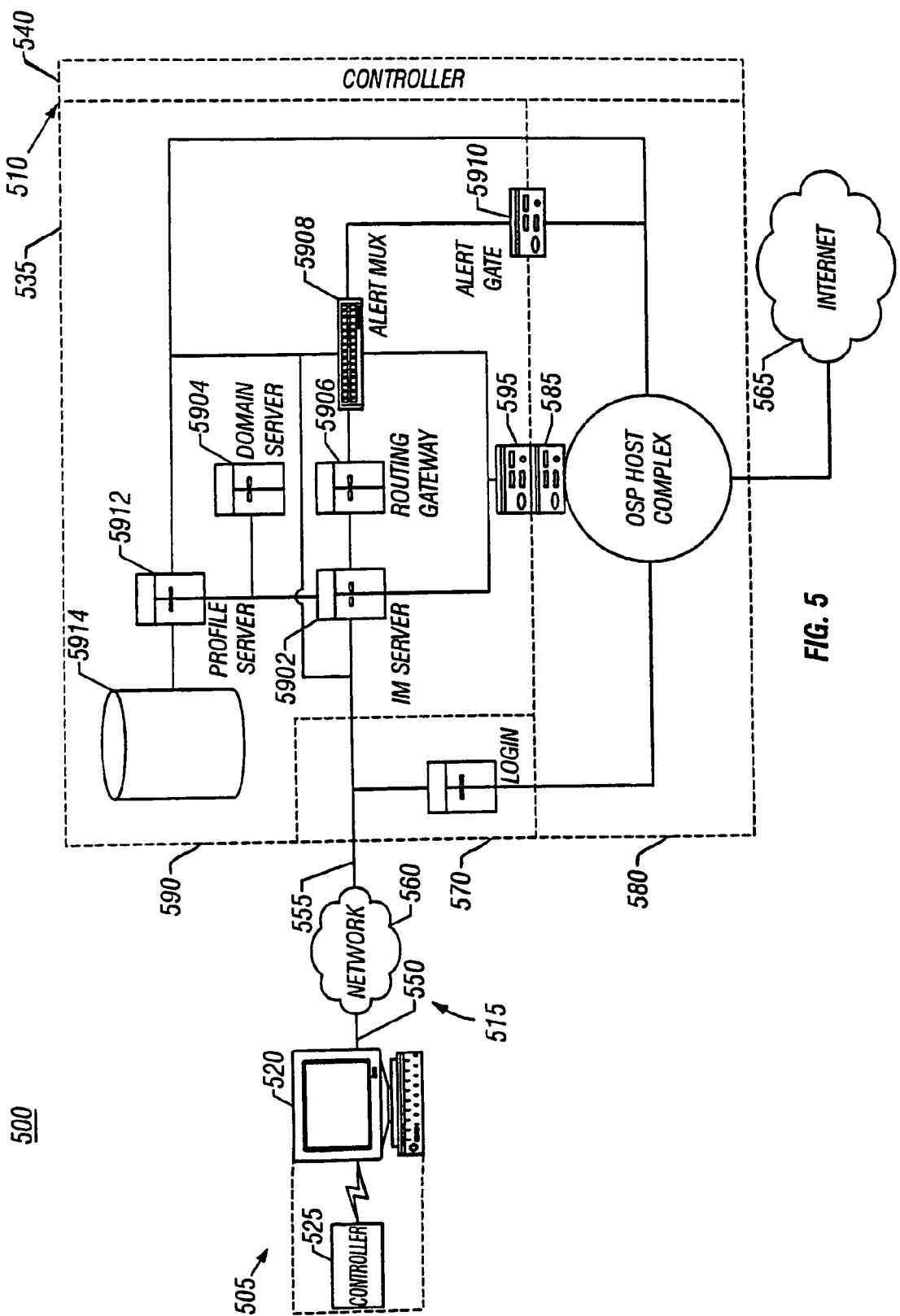

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IF address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the EP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 580 to share subscriber profile data with other services. Alternatively, user profile data may be saved locally on the client device 505.

Figure 6:
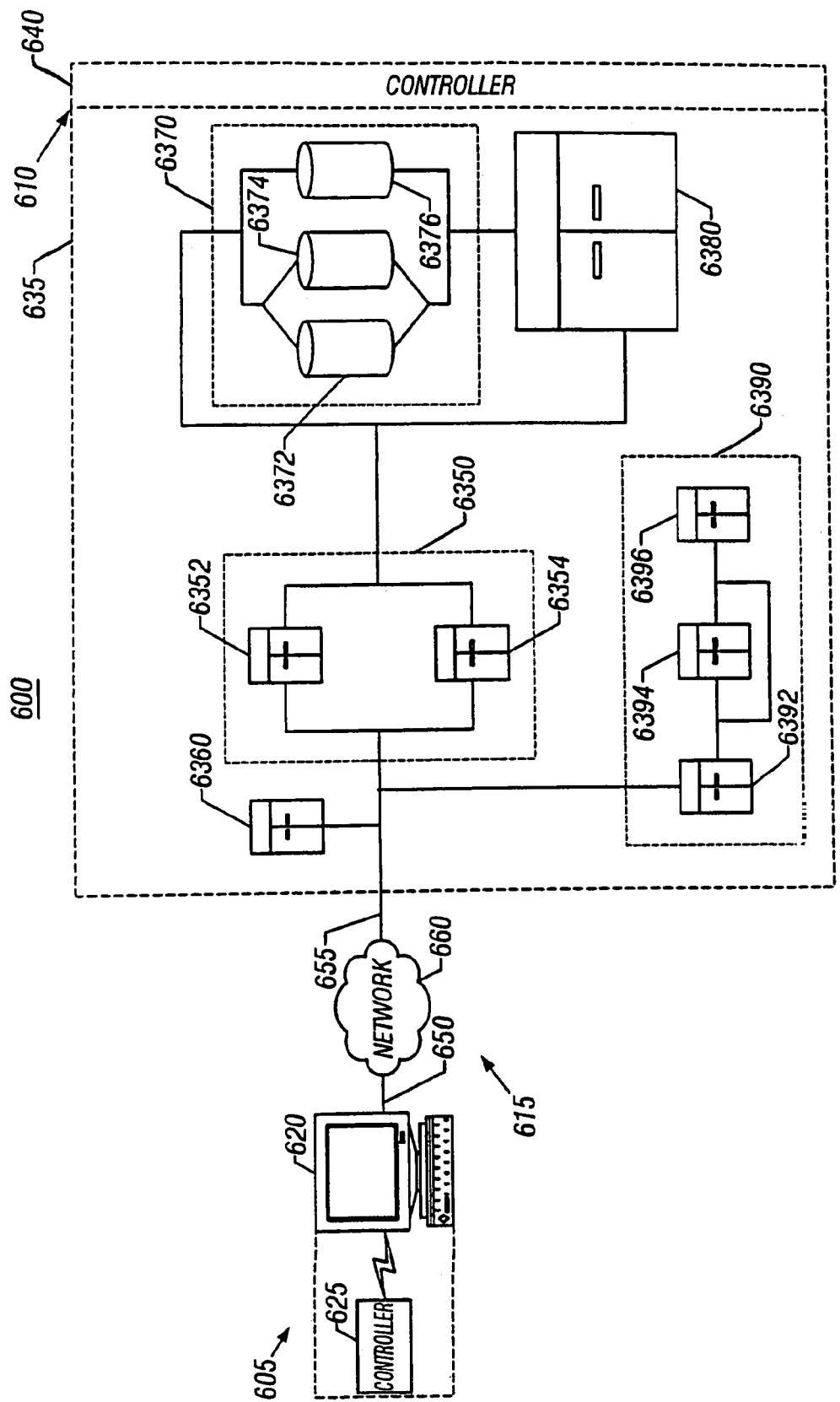

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited, to a telephone network and/or the Internet.

Examples of each element within the communication system of FIG. 6 are broadly described above with respect to FIGS. 1-5. In particular, the client system 605 and the communications link 615 typically have attributes comparable to those described with respect to client systems 105, 205, 305, 405, and 505 and communications links 115, 215, 315, 415, and 515 of FIGS. 1-5. Likewise, the host system 610 of FIG. 6 may have attributes comparable to the host systems 110, 210, 310, 410, and 510 shown in FIGS. 1-5, and may illustrate one possible implementation of those systems. However, FIG. 6 describes an aspect of the host system 610, focusing primarily on one particular implementation of the host device 635.

The client system 605 includes a client device 620 and a client controller 625. The client controller 625 is capable of establishing a connection to the host system 610 through the delivery network 615. In one implementation, the client controller 625 includes one or more applications, such as an IM application, an OSP application, and/or an Internet browser application.

The host system 610 includes a host device 635 and a host controller 640. The host controller 640 is capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host device 635 includes a mail gateway 6350 having a send mail server 6352 and a read mail server 6354. The send mail server 6352 is configured to perform functions relating to transmitting electronic data. The read mail server 6354 is configured to perform functions relating to receiving and accessing electronic data. The mail gateway 6350 is in communication with one or more processing servers 6360.

The mail gateway 6350 also is in communication with the storage area 6370 and a tandem database 6380. The storage area 6370 includes electronic content databases 6372, 6374 and attachment database 6376. The tandem database 6380 includes a system of folders that store electronic data for subscribers of the host system 610.

The host device 635 also includes an IM host complex 6390. The IM host complex server 6390 typically has attributes comparable to some or all elements of IM host complexes 390, 490, and 590. The IM host complex 6390 includes an e-buddy server 6392 in communication with the client system 605, the read mail server 6352, a look-up server 6394, and an IM server 6396. The IM server 6396 is capable of supporting instant messaging services, the look-up server 6394 is capable of finding subscriber account information (e.g., screen name) from a given e-mail address, and the e-buddy server is 6392 is capable of configuring IM communication between the intended recipient of an e-mail message and the sender and/or other recipients of the e-mail message.

Figure 7:
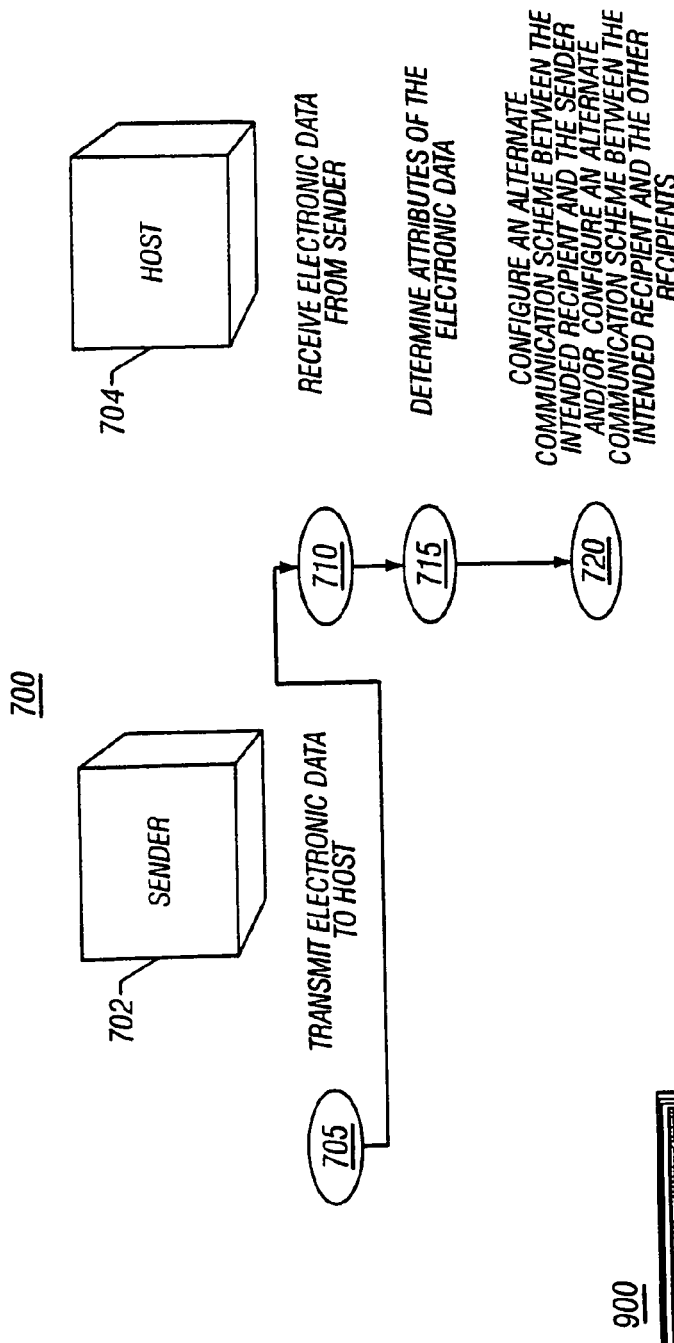
FIGS. 7 and 8 are flow charts of communications method that may be implemented by the systems of FIGS. 1-6.

Referring to FIG. 7, a sender 702 and a host 704 interact according to a procedure 700 to transmit electronic data. The procedure 700 may be implemented by any type of hardware, software, device, computer, computer system, equipment, component, program, application, code, storage medium, or propagated signal.

Figure 8:
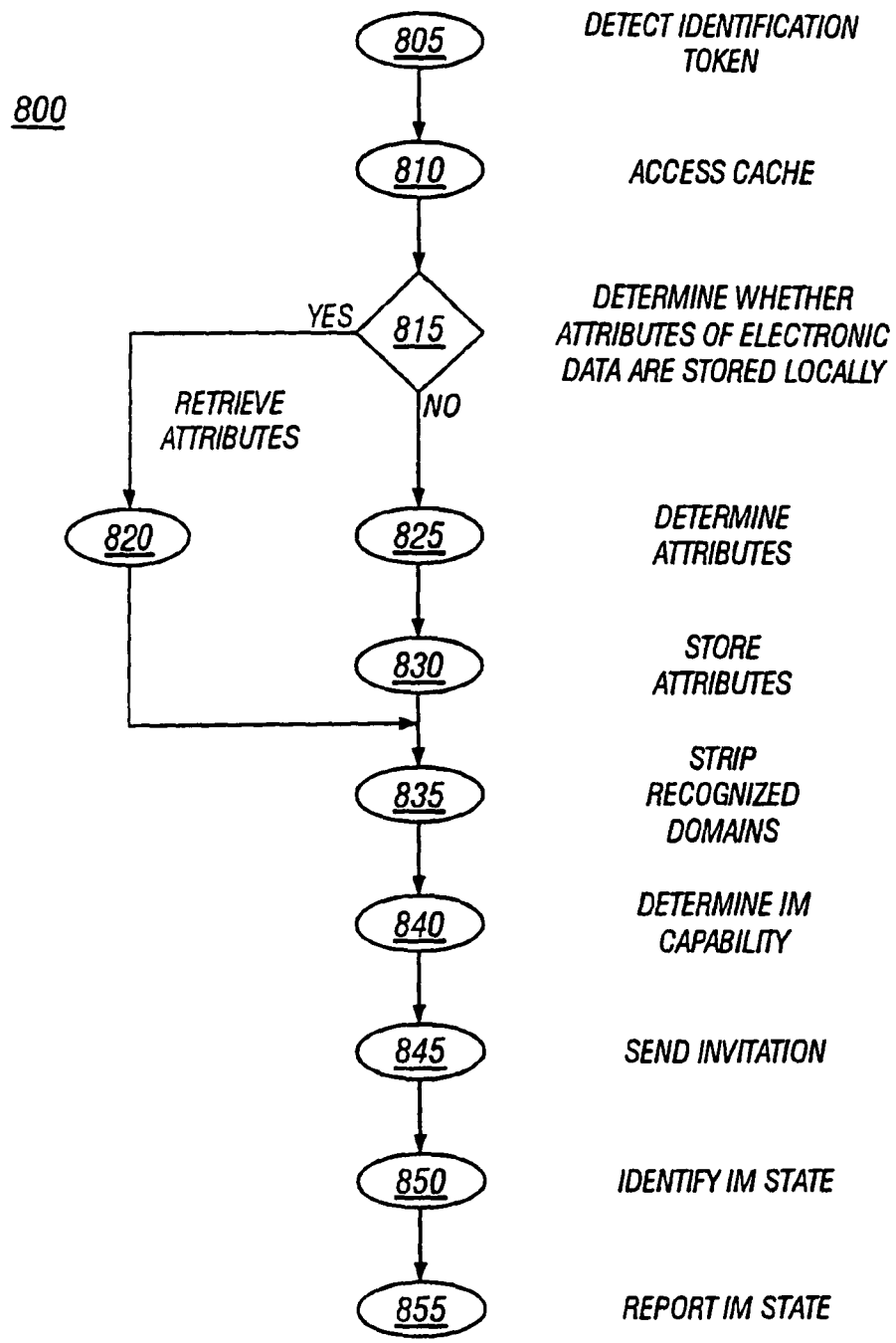

Examples of each element of FIGS. 7 and 8 are broadly described above with respects to FIGS. 1-6. In particular, the sender 702 typically has attributes comparable to those described with respect to client devices 120, 220, 320, 420, 520, and 620 and/or client controllers 125, 225, 325, 425, 525, and 625. The host 704 typically has attributes comparable to those described above with respect to host devices 135, 235, 335, 435, 535, and 635 and/or host controllers 140, 240, 340, 440, 540, and 640. The sender 702 and/or the host 704 may be directly or indirectly interconnected through a known or described delivery network.

Initially, the sender 702 transmits electronic data to the host 704 (step 705). In one implementation, the sender 702 is a client system 605 associated with an end user of the communication system 600. In another implementation, the sender 702 aids the client system 605 in transmitting electronic data through a communications link 615 to the host system 610. In yet another implementation, the sender 702 is a processing server 6360 within the host system 610. For example, the processing server 6360 may be a web mail server arranged to store and forward electronic data transmitted between end users of the communication system 600.

The host 704 receives the electronic data from the sender 702 (step 710). In one implementation, the mail gateway 6350 receives the electronic data from the client system 605 and/or the processing server 6360. Typically, the mail gateway 6350 will receive electronic content from subscribers through a dial-up telephone network or DSL (digital subscriber line) and will receive electronic content from non-subscribers indirectly through the Internet. The mail gateway 6350 may perform protocol conversions if necessary to receive electronic content from non-subscribers.

After receiving the electronic data from the sender 702 (step 710), the host 704 determines one or more attributes of the electronic data (step 715). Attributes of the electronic data may include, but are not limited to, an identification token, the author of the electronic data, the recipient(s) of the electronic data, the subject of the electronic data, the date and time of the transmission, and/or whether the electronic data contains attachments or embedded images. The host 704 typically stores the contents and attributes of the electronic data. For example, in one implementation, contents of the electronic data are stored in the storage area 6370 and the attributes of the electronic data are cached locally in the e-buddy server 6392 and also are stored in the tandem database 6380. The body of the electronic data is stored in electronic content databases 6372, 6374 and any attachments are stored in the attachment database 6376. In this example, the body of the electronic data is stored twice to assure its availability. Due to the typically large sizes of attachments, however, such objects are only stored once to conserve memory space.

The tandem database 6380 includes a system of folders corresponding to the subscribers of the host system 610. Each folder may have properties assigned by the subscriber including, for example, properties for filtering electronic content from certain sources. When electronic data are received, the folder stores the attributes of the electronic data including the location(s) of the electronic data content (i.e., body and attachments) in the storage area 6370.

The host 704 then configures an alternate communication scheme between the intended recipient and the sender 702 and/or configures an alternate communication scheme between the intended recipient and other recipients based on the detected attributes of the electronic data (step 720).

FIG. 8 illustrates one implementation of a procedure 800 for configuring an alternate communications scheme. Initially, the e-buddy server 6392 detects an identification token associated with incoming electronic data (e.g., an e-mail message) (step 805). The identification token may be intercepted by the e-buddy server 6392 and/or presented to the e-buddy server 6392 by the client system 605, the processing server 6360, and/or the read mail server 6352. By referencing the token, the e-buddy server 6392 accesses a cache (step 810) and determines whether attributes of the electronic data are stored locally (step 815). Such attributes may include, but are not limited to, a listing of the sender and all recipients associated with the electronic data.

If attributes of the electronic data are stored locally, the e-buddy server 6392 retrieves the attributes from the local cache (step 820). If, on the other hand, attributes of the electronic data are not stored locally, the e-buddy server 6392 determines the attributes of the electronic data (step 825) and then stores the attributes in a local cache (step 830). The e-buddy server 6392 may determine the attributes of the electronic data itself and/or access another server to determine the attributes. In one implementation, the e-buddy server 6392 accesses the read mail server 6354. The read mail server 6354 then determines attributes of the electronic data, including a listing of the sender and the recipients associated with the electronic data, and presents the attributes to the e-buddy server 6392. The e-buddy server 6392 receives the listing from the read mail server 6354 and stores the listing in a local cache.

The sender and the recipients listed may or may not be subscribers of the communication system 600. In one implementation, the listing includes e-mail addresses of subscribers and non-subscribers. The e-buddy server 6392 strips the domain (e.g., @aol.com) from the e-mail address of a subscriber with a recognized domain to obtain the subscriber's screen name (step 835). This step facilitates the reverse look-up process.

The e-buddy server 6392 sends the listing of e-mail addresses to the look-up server 6394. The look-up server determines the instant messaging capability of each of the e-mail addresses and/or screen names (step 840). In one implementation, the look-up server 6394 determines whether each e-mail address is associated with a subscriber of the communication system 600 and/or the IM host complex 6390. In another implementation, the look-up server 6394 checks to see whether a screen name is associated with an active account having IM capability.

The look-up server 6394 reports back to the e-buddy server 6392 and identifies to the e-buddy server 6392 which of the sender and the recipients have the capability to communicate using instant messaging.

Based on this information, the e-buddy server 6392 interacts with the IM server 6396. In one implementation, the e-buddy server 6392 instructs the IM server 6396 to send an invitation to those without instant messaging capability (step 845). The invitation may invite the sender and/or recipient to subscribe to the IM host complex 6390 and/or the host system 610. For those with instant messaging capability, the e-buddy server 6392 requests the IM server 6396 to identify the IM state of the particular user (e.g., online, offline, away, busy). As described above, the IM server 6396 may be a network of interconnected servers capable of determining the status or online presence of subscribers. The online presence of a particular subscriber can be detected, for example, from a persistent connection to an IM server and/or the activity of a specific control port.

In response to the request(s) from e-buddy server 6392, the IM server 6396 identifies the IM state of each of the sender and the recipients (e.g., online, offline, not a member) (step 850). In one implementation the IM state is given by whether each of the sender and recipients is online, offline, or does not have instant messaging capability. The IM server 6396 and/or the e-buddy server 6392 reports the IM state of each of the sender and recipients to the intended recipient (step 855). In one implementation, a particular graphical user interface is displayed to the recipient based on the IM state. For example, upon opening an e-mail message, the recipient may receive one or more redirection commands based on the IM state of the sender and any other addressees of the e-mail message. The redirection command may include a URL for navigating the recipient's browser to a particular URL associated with a graphical user interface and/or an icon corresponding to one of the IM states.

Figure 9:
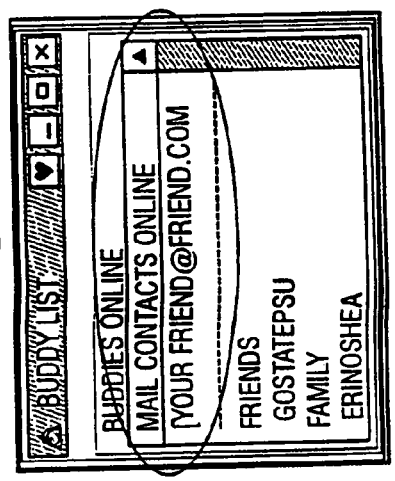
FIGS. 9 and 10 are illustrations of different graphical user interfaces that may be provided by the systems of FIGS. 1-6.

Referring to FIG. 9, a UI 900 illustrates an example of how the IM state of each of the sender and to recipients may be reported to the intended recipient. The UI 900 includes a buddy list window. In this example, the people on an e-mail message who are able to receive instant messages will appear in the buddy list window in a new group called Mail Contacts. A user may send an instant message to a person in the Mail Contacts list by clicking that person's screen name.

Figure 10:
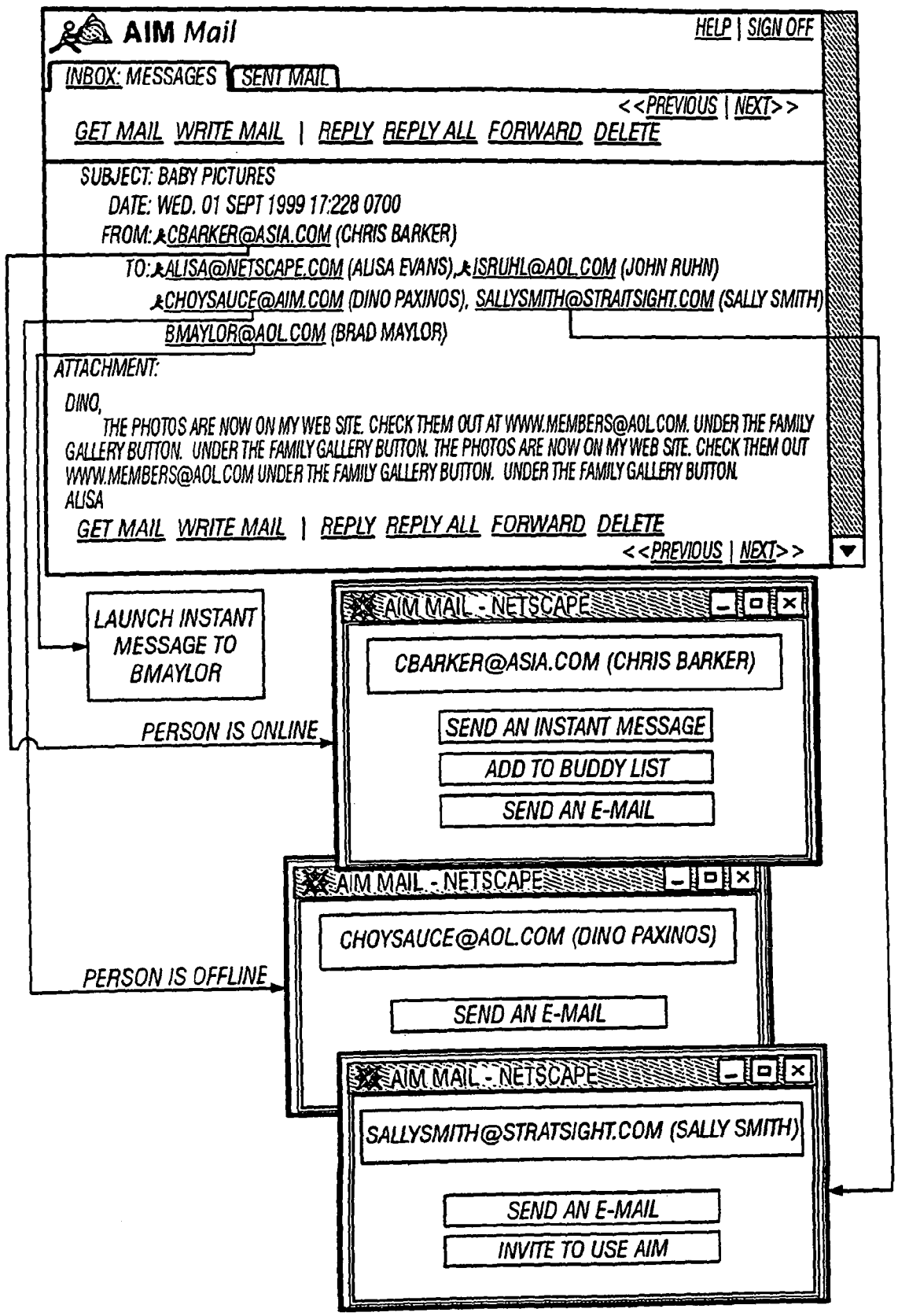

FIG. 10 illustrates another example of how the IM state of each of the sender and the recipients may be represented. An icon next to a person's address in an e-mail message may indicate to the recipient that the person has IM capability. By clicking on the person's address, the recipient may launch an instant message. Where an icon does not appear next to a person's address, the person does not presently have IM capability. By clicking on the person's address, the recipient may send an e-mail message to the person. If the person is not a member of any IM service, the recipient can send the person an invitation.

Other implementations are within the scope of the following claims. For example, The general aspects described above relate to instant messaging and e-mail as well as other forms of communication such as, for example, telephonic communication (e.g., mobile phones, pagers).

What is claimed is:

1. A communications method executing on hardware for initiating instant messaging communication, the method comprising:
   receiving, on a computer and on behalf of a user, an e-mail message having at least one address field;
   locating, within the address field of the received e-mail message, a sender address from which the e-mail message was sent;
   in response to locating, within the address field of the received e-mail message, the sender address from which the e-mail message was sent, identifying an instant messaging subscriber based on the located sender address from which the e-mail message was sent;
   in response to identifying the instant messaging subscriber, accessing a server to determine if the identified instant messaging subscriber is online; and
   in response to determining that the instant messaging subscriber is online, presenting to the user an option to initiate instant messaging communication with the instant messaging subscriber.

2. The method as in claim 1 wherein the instant messaging subscriber is identified by accessing a server.

3. The method as in claim 1 further comprising presenting to the user an icon in the e-mail message to indicate that the instant messaging subscriber is online in response to determining that the instant messaging subscriber is online.

4. The method of claim 1 wherein:
   locating, within the address field of the received e-mail message, a sender address from which the e-mail message was sent includes locating, within the address field of the received e-mail message, a sender address from which the e-mail message was sent automatically and without additional user intervention in response to receiving the e-mail message;
   identifying an instant messaging subscriber based on the located sender address from which the e-mail message was sent includes identifying an instant messaging subscriber based on the located sender address from which the e-mail message was sent automatically and without additional user intervention;
   accessing a server to determine if the identified instant messaging subscriber is online includes accessing a server to determine if the identified instant messaging subscriber is online includes accessing a server to determine if the identified instant message subscriber is online automatically and without additional user intervention; and presenting to the user an option to initiate instant messaging communication with the instant messaging subscriber includes presenting to the user an option to initiate instant messaging communication with the instant messaging subscriber automatically and without additional user intervention.

5. The method of claim 1 further comprising displaying, within a graphical user interface, the received e-mail message, wherein presenting to the user an option to initiate instant messaging communication with the instant messaging subscriber includes displaying, within the graphical user interface, a control that is configured to enable the user to initiate instant messaging communication with the instant messaging subscriber.

6. A communications method executing on hardware for initiating instant messaging communication, the method comprising:
    receiving, on a computer and on behalf of a user, an e-mail message that has at least one address field and that is addressed to a first recipient address, the first recipient address corresponding to the user;
    locating, within the address field of the received e-mail message, a second recipient address to which the e-mail message was sent;
    in response to and based on locating, within the address field of the received e-mail message, the second recipient address, identifying an instant messaging subscriber based on the located second recipient address to which the e-mail message was sent;
    in response to and based on identifying the instant messaging subscriber, accessing a server to determine if the instant messaging subscriber is online; and
    in response to and based on determining that the instant messaging subscriber is online, presenting to the user an option to initiate instant messaging communication with the instant messaging subscriber.

7. The method as in claim 6 wherein the instant messaging subscriber is identified by accessing a server.

8. The method as in claim 6 further comprising presenting to the user an icon in the e-mail message to indicate that the instant messaging subscriber is online in response to determining that the instant messaging subscriber is online.

9. The method of claim 6 wherein:
    locating, within the address field of the received e-mail message, a second recipient address to which the e-mail message was sent includes locating, within the address field of the received e-mail message, a second recipient address to which the e-mail message was sent automatically and without additional user intervention in response to receiving the e-mail message;
    identifying an instant messaging subscriber based on the located second recipient address to which the e-mail message was sent includes identifying an instant messaging subscriber based on the located second recipient address to which the e-mail message was sent automatically and without additional user intervention;
    accessing a server to determine if the instant messaging subscriber is online includes accessing a server to determine if the instant message subscriber is online automatically and without additional user intervention; and
    presenting to the user an option to initiate instant messaging communication with the instant messaging subscriber includes presenting to the user an option to initiate instant messaging communication with the instant messaging subscriber automatically and without additional user intervention.

10. The method of claim 6 further comprising displaying, within a graphical user interface, the received e-mail message, wherein presenting to the user an option to initiate instant messaging communication with the instant messaging subscriber includes, displaying, within the graphical user interface, a control that is configured to enable the user to initiate instant messaging communication with the instant messaging subscriber.

11. A computer-readable hardware storage medium having embodied thereon a computer program including instructions that, when executed, cause a computer to:
    receive, on behalf of a user, an e-mail message having at least one address field;
    locate, within the address field of the received e-mail message, a sender address from which the e-mail message was sent;
    in response to locating, within the address field of the received e-mail message, the sender address from which the e-mail message was sent, identify an instant messaging subscriber based on the located sender address from which the e-mail message was sent;
    in response to identifying the instant messaging subscriber, access a server to determine if the identified instant messaging subscriber is online; and
    in response to determining that the instant messaging subscriber is online, present to the user an option to initiate instant messaging communication with the instant messaging subscriber.

12. The computer-readable hardware storage medium of claim 11 wherein the instructions that, when executed, cause a computer to identify the instant messaging subscriber include instructions that, when executed, cause a computer to identify the instant messaging subscriber by accessing a server.

13. The computer-readable hardware storage medium of claim 11 further comprising instructions that, when executed, cause a computer to present to the user an icon in the e-mail message to indicate that the instant messaging subscriber is online in response to determining that the instant messaging subscriber is online.

14. The computer-readable hardware storage medium of claim 11 wherein:
    the instructions that, when executed, cause a computer to locate, within the address field of the received e-mail message, a sender address from which the e-mail message was sent include instructions that, when executed, cause a computer to locate, within the address field of the received e-mail message, a sender address from which the e-mail message was sent automatically and without additional user intervention in response to receiving the e-mail message;
    the instructions that, when executed, cause a computer to identify an instant messaging subscriber based on the located sender address from which the e-mail message was sent include instructions that, when executed, cause a computer to identify an instant messaging subscriber based on the located sender address from which the e-mail message was sent automatically and without additional user intervention;
    the instructions that, when executed, cause a computer to access a server to determine if the identified instant messaging subscriber is online include instructions that, when executed, cause a computer to access a server to determine if the identified instant messaging subscriber is online automatically and without additional user intervention; and the instructions that, when executed, cause a computer to present to the user an option to initiate instant messaging communication with the instant messaging subscriber include instructions that, when executed, cause a computer to present to the user an option to initiate instant messaging communication with the instant messaging subscriber automatically and without additional user intervention.

15. A computer-readable hardware storage medium having embodied thereon a computer program including instructions that, when executed, cause a computer to:
   receive, on behalf of a user, an e-mail message that has at least one address field and that is addressed to a first recipient address, the first recipient address corresponding to the user;
   locate, within the address field of the received e-mail message, a second recipient address to which the e-mail message was sent;
   in response to and based on locating, within the address field of the received e-mail message, the second recipient address, identify an instant messaging subscriber based on the located second recipient address to which the e-mail message was sent;
   in response to and based on identifying the instant messaging subscriber, access a server to determine if the instant messaging subscriber is online; and
   in response to and based on determining that the instant messaging subscriber is online, present to the user an option to initiate instant messaging communication with the instant messaging subscriber.

16. The computer-readable hardware storage medium of claim 15 wherein the instructions that, when executed, cause a computer to identify the instant messaging subscriber include instructions that, when executed, cause a computer to identify the instant messaging subscriber by accessing a server.

17. The computer-readable hardware storage medium of claim 15 further comprising instructions that, when executed, cause a computer to present to the user an icon in the e-mail message to indicate that the instant messaging subscriber is online in response to determining that the instant messaging subscriber is online.

18. The computer-readable hardware storage medium of claim 15 wherein:
   the instructions that, when executed, cause a computer to locate, within the address field of the received e-mail message, a second recipient address to which the e-mail message was sent include instructions that, when executed, cause a computer to locate, within the address field of the received e-mail message, a second recipient address to which the e-mail message was sent automatically and without additional user intervention in response to receiving the e-mail message;
   the instructions that, when executed, cause a computer to identify an instant messaging subscriber based on the located second recipient address to which the e-mail message was sent include instructions that, when executed, cause a computer to identify an instant messaging subscriber based on the located second recipient address to which the e-mail message was sent automatically and without additional user intervention;
   the instructions that, when executed, cause a computer to access a server to determine if the instant messaging subscriber is online include instructions that, when executed, cause a computer to access a server to determine if the instant messaging subscriber is online automatically and without additional user intervention; and
   the instructions that, when executed, cause a computer to present to the user an option to initiate instant messaging communication with the instant messaging subscriber include instructions that, when executed, cause a computer to present to the user an option to initiate instant messaging communication with the instant messaging subscriber automatically and without additional user intervention.

\* \* \* \* \*